(12) United States Patent
Hanaoka

(10) Patent No.: US 11,575,545 B2
(45) Date of Patent: Feb. 7, 2023

(54) TRANSMISSION DEVICE, INTERFACE, AND TRANSMISSION METHOD

(71) Applicant: SONY SEMICONDUCTOR SOLUTIONS CORPORATION, Kanagawa (JP)

(72) Inventor: Katsushi Hanaoka, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/310,083

(22) PCT Filed: Oct. 15, 2019

(86) PCT No.: PCT/JP2019/040449
§ 371 (c)(1),
(2) Date: Jul. 15, 2021

(87) PCT Pub. No.: WO2020/152926
PCT Pub. Date: Jul. 30, 2020

(65) Prior Publication Data
US 2022/0158873 A1 May 19, 2022

(30) Foreign Application Priority Data
Jan. 25, 2019 (JP) .............................. JP2019-010742

(51) Int. Cl.
*H04L 25/02* (2006.01)
(52) U.S. Cl.
CPC ........ *H04L 25/0278* (2013.01); *H04L 25/028* (2013.01); *H04L 25/0266* (2013.01); *H04L 25/0272* (2013.01)

(58) Field of Classification Search
CPC ............... H04L 25/02; H04L 25/026; H04L 25/0264; H04L 25/0266; H04L 25/0268;
(Continued)

(56) References Cited

U.S. PATENT DOCUMENTS 5,208,693 A 5/1993 Arstein et al.
5,412,498 A 5/1995 Arstein et al.
(Continued)

FOREIGN PATENT DOCUMENTS

AU 1740192 A 11/1992
CA 2104694 A 9/1992
(Continued)

OTHER PUBLICATIONS

International Search Report and Written Opinion of PCT Application No. PCT/JP2019/040449, dated Dec. 10, 2019, 06 pages of ISRWO.

*Primary Examiner* — Young T. Tse
(74) *Attorney, Agent, or Firm* — Chip Law Group

(57) ABSTRACT

In a transmission device connected by AC coupling, time taken before the start of transmission of valid data is shortened. The transmission device includes an internal resistor, an internal circuit, and a transmission-side control unit. One end of the internal resistor is connected to an output terminal connected to a capacitor. The internal circuit supplies one of a plurality of potentials different from each other to another end of the internal resistor. The transmission-side control unit performs control to supply one of the plurality of potentials to the internal circuit over a period from time when a potential of the output terminal is initialized to a predetermined initial value to timing when the potential of the output terminal reaches a predetermined specified value.

8 Claims, 18 Drawing Sheets

(58) Field of Classification Search
CPC ............. H04L 25/0272; H04L 25/0278; H04L 25/028; H04L 25/0286
USPC ....... 375/219, 220, 257; 333/124, 130, 24 R, 333/25, 32, 24 C
See application file for complete search history.

(56) References Cited

U.S. PATENT DOCUMENTS

| | | | | |
|---|---|---|---|---|
| 2003/0091183 A1* | 5/2003 | Holcombe | ........... | H04B 14/026 379/399.01 |
| 2011/0032113 A1* | 2/2011 | Gallavan | ................ | G01R 31/60 324/66 |
| 2018/0034582 A1 | 2/2018 | Nakahara et al. | | |

FOREIGN PATENT DOCUMENTS

| | | | | | |
|---|---|---|---|---|---|
| CN | 101051069 A | * | 10/2007 | | |
| CN | 106211414 B | * | 5/2018 | ............. | H02M 3/04 |
| JP | 8-502862 A | | 3/1996 | | |
| JP | 2011-151664 A | | 8/2011 | | |
| JP | 5049982 A | | 10/2012 | | |
| WO | 1992/017966 A1 | | 10/1992 | | |
| WO | 2016/147902 A1 | | 9/2016 | | |

* cited by examiner

| SERIAL DATA | OPERATION OF INTERNAL CIRCUIT | |
|---|---|---|
| | POSITIVE-SIDE TRANSMISSION END POTENTIAL $V_{endp}$ | NEGATIVE-SIDE TRANSMISSION END POTENTIAL $V_{endn}$ |
| 0 | 0.0V | 0.4V |
| 1 | 0.4V | 0.0V |

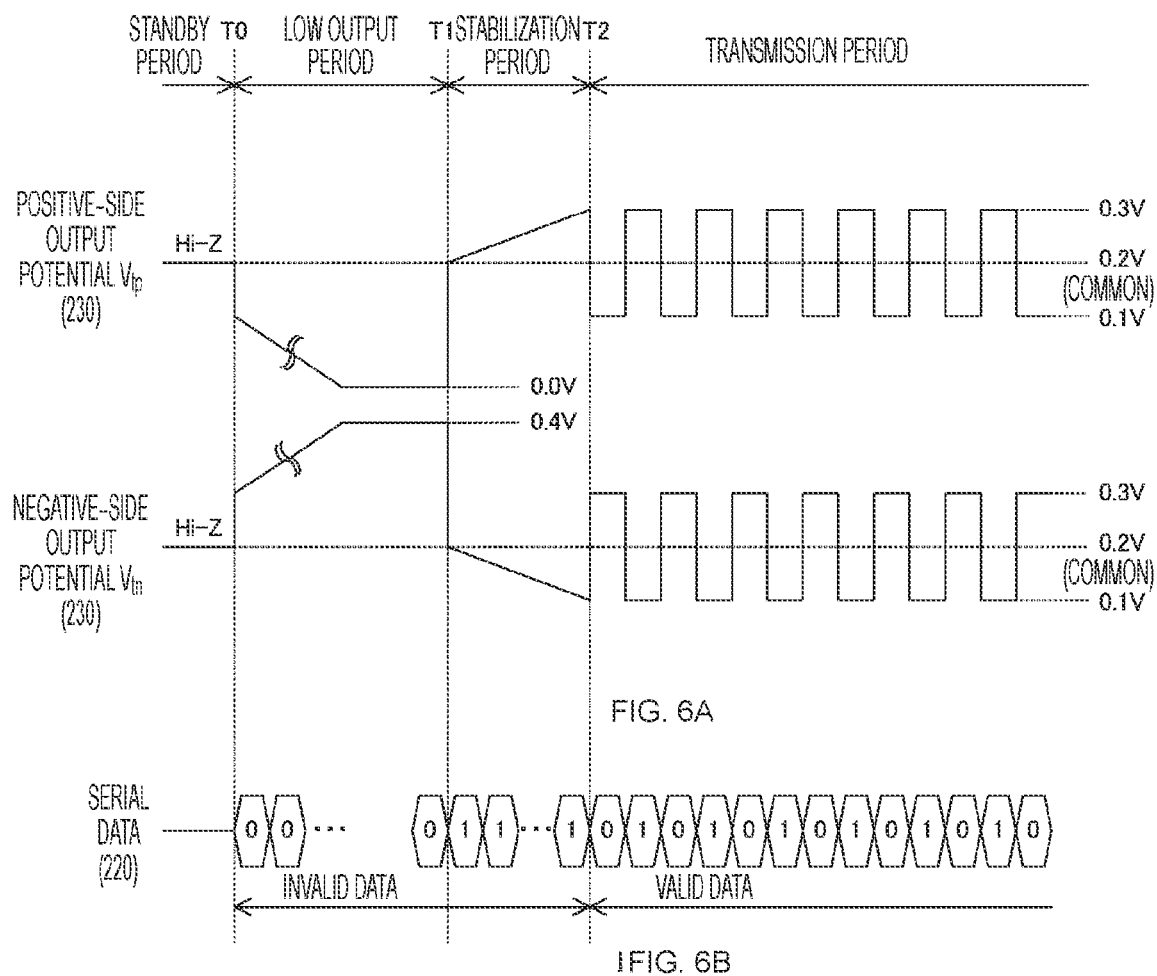

TRANSMISSION DEVICE, INTERFACE, AND TRANSMISSION METHOD

CROSS REFERENCE TO RELATED APPLICATIONS

This application is a U.S. National Phase of International Patent Application No. PCT/JP2019/040449 filed on Oct. 15, 2019, which claims priority benefit of Japanese Patent Application No. JP 2019-010742 filed in the Japan Patent Office on Jan. 25, 2019. Each of the above-referenced applications is hereby incorporated herein by reference in its entirety.

TECHNICAL FIELD

The present technology relates to a transmission device, an interface, and a transmission method. More specifically, the present technology relates to a transmission device, an interface, and a transmission method for transmitting serial data.

BACKGROUND ART

Conventionally, interfaces using alternating current (AC) coupling have been used for the purpose of, for example, absorbing a difference in ground between a transmission side and a reception side. Here, AC coupling is a method of connecting a transmission device and a reception device by a transmission path in which a capacitor is inserted. For example, an AC-coupled interface is proposed in which a transmission device causes transition of the potential of the transmission end from a high impedance to a fixed potential at the time of data transmission and then inputs a predetermined bit string to a driver for a certain period (for example, see Patent Document 1). In this bit string, a logical value "0" and a logical value "1" are alternately repeated, and with this bit string, the transmission device can gradually change the amplitude of an output signal of the driver to bring the amplitude to a specified value. Then, when the amplitude reaches the specified value and becomes stable, the transmission device starts transmission of valid data.

CITATION LIST

Patent Document

Patent Document 1: Japanese Patent No. 5049982

SUMMARY OF THE INVENTION

Problems to be Solved by the Invention

In the above-mentioned conventional technology, since the transmission device transmits valid data after the amplitude stabilizes at the specified value, it is possible to prevent a transmission error from occurring due to transmission of data in a state where the amplitude is different from the specified value. However, there is a disadvantage that the larger the capacitance of the capacitor or a terminating resistance in the transmission path is, the longer it takes for the amplitude of the output signal of the driver to stabilize. As a result, it takes longer time before the start of transmission of valid data. Note that although reducing the capacitance of the capacitor can shorten the time taken before the start of transmission of valid data, this is not preferable since the stability is deteriorated.

The present technology has been devised in view of such a situation, and an object of the present technology is to shorten the time taken before the start of transmission of valid data in a transmission device connected by AC coupling.

Solutions to Problems

The present technology has been made to solve the above-mentioned problems, and a first aspect thereof is a transmission device including: an internal resistor having one end connected to an output terminal connected to a capacitor; an internal circuit that supplies one of a plurality of potentials different from each other to another end of the internal resistor; and a transmission-side control unit that performs control to supply one of the plurality of potentials to the internal circuit over a period from time when a potential of the output terminal is initialized to a predetermined initial value to time when the potential of the output terminal reaches a predetermined specified value, and a transmission method thereof. Therefore, there is an effect that one of the plurality of potentials is supplied to the internal resistor over the period from the time when the potential of the output terminal is initialized to the time when the potential reaches the predetermined specified value.

In the first aspect, a timing supply unit that supplies data regarding timing at which the potential of the output terminal reaches the specified value may further be included, and the transmission-side control unit may acquire the timing from the data. Therefore, there is an effect of acquiring timing at which the specified value is reached.

Moreover, in the first aspect, the timing supply unit may supply, to the transmission-side control unit, the data indicating time taken from the time when the potential is initialized to the initial value to the timing. Therefore, there is an effect that the timing is acquired on the basis of the data indicating the time taken from the time when the potential is initialized to the timing when the potential reaches the specified value.

Furthermore, in the first aspect, the timing supply unit may supply, as the data, a comparison result obtained from comparison between the specified value and the potential of the output terminal to the transmission-side control unit, and the transmission-side control unit may acquire, as the timing, timing at which the comparison result is inverted. Therefore, there is an effect that the timing is acquired from the comparison result of comparison between the above specified value and the potential of the output terminal.

Furthermore, in the first aspect, the capacitor may include a positive-side capacitor and a negative-side capacitor, the output terminal may include a non-inverting output terminal and an inverting output terminal, the internal resistor may include a positive-side internal resistor having one end connected to the non-inverting output terminal and a negative-side internal resistor having one end connected to the inverting output terminal, the plurality of potentials may include a pair of potentials, and the internal circuit may supply one of the pair of potentials to another end of the positive-side internal resistor and supply another one of the pair of potentials to another end of the negative-side internal resistor. Therefore, there is an effect that serial data is differentially transmitted.

Furthermore, in the first aspect, a parallel-serial converter that converts parallel data into serial data and supplies the serial data to the internal circuit may further be included, and the transmission-side control unit may generate the parallel data containing valid data obtained by encoding transmission data and invalid data for controlling the internal circuit and supply the parallel data to the parallel-serial converter. Therefore, there is an effect that the internal circuit is controlled by the serial data converted from the parallel data.

In addition, a second aspect of the present technology is an interface including: a transmission device including: an internal resistor having one end connected to an output terminal connected to a capacitor; an internal circuit that supplies one of a plurality of potentials different from each other to another end of the internal resistor; and a transmission-side control unit that performs control to supply one of the plurality of potentials to the internal circuit over a period from time when a potential of the output terminal is initialized to a predetermined initial value to time when the potential of the output terminal reaches a predetermined specified value; and a reception device that receives data via the capacitor. Therefore, there are effects that one of the plurality of potentials is supplied to the internal resistor over the period from the time when the potential of the output terminal is initialized to the time when the potential reaches the predetermined specified value and that data is received via the internal resistor and the capacitor.

BRIEF DESCRIPTION OF DRAWINGS

FIGS. 6A and 6B are timing charts illustrating an example of fluctuations in the potential on a transmission side and serial data in the first embodiment of the present technology.

MODE FOR CARRYING OUT THE INVENTION

Embodiments for carrying out the present technology (hereinafter referred to as the "embodiments") will be described below. Description will be given in the following order.

1. First Embodiment (Example in which the potential of another end of an internal resistor is kept constant over a stabilization period)
2. Second Embodiment (Example in which the potential of another end of an internal resistor is kept constant over a stabilization period until a comparison result is inverted)
3. Third Embodiment (Example of fixing potential on reception side)
4. Exemplary Application to Mobile Object 1. First Embodiment

[Exemplary Configuration of Imaging Device]

Figure 1A:
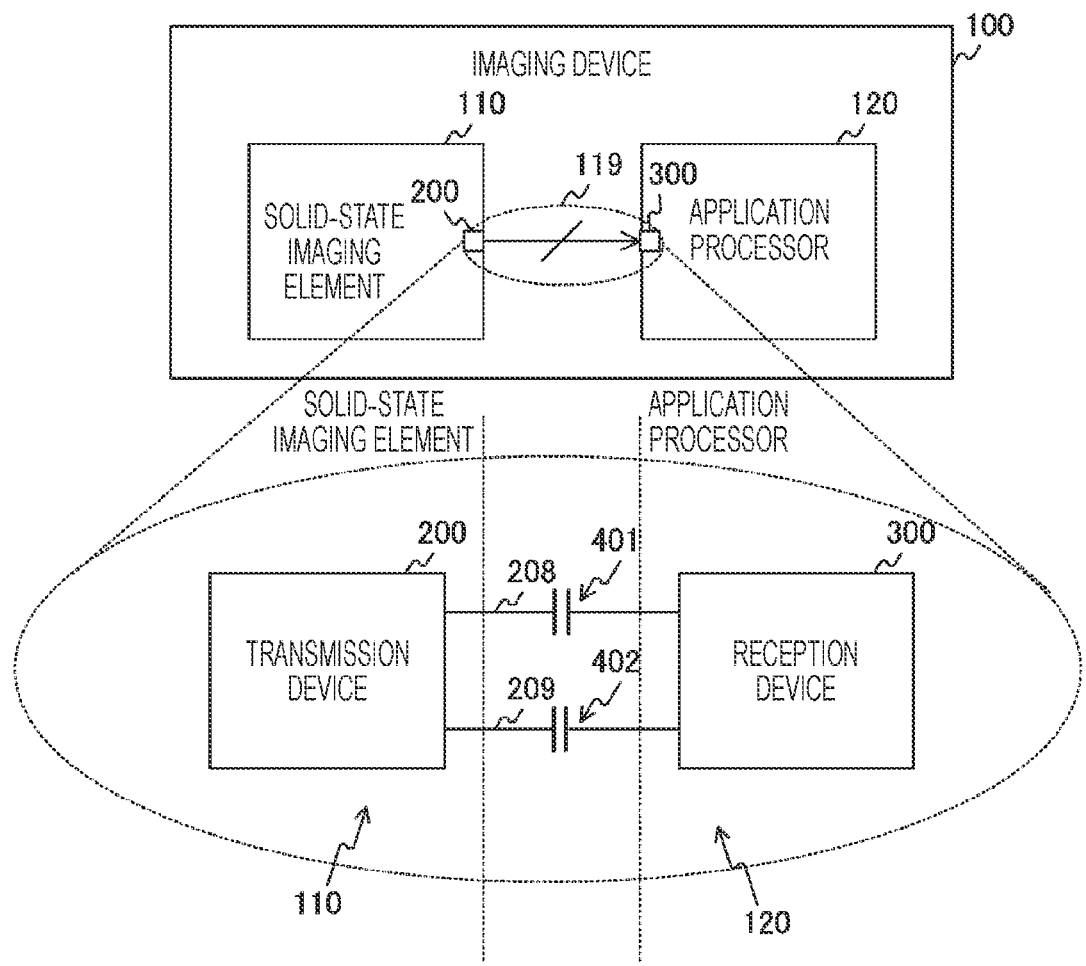
FIGS. 1A and 1B are block diagrams illustrating a configuration example of an imaging device of a first embodiment of the present technology.

FIG. 1A is a block diagram illustrating a configuration example of an imaging device 100 of an embodiment of the present technology. The imaging device 100 is for capturing image data and includes a solid-state imaging element 110 and an application processor 120.

The solid-state imaging element 110 generates image data by photoelectric conversion. The solid-state imaging element 110 supplies image data to the application processor 120 via an interface 119. As the interface 119, for example, a high-speed interface conforming to the scalable low voltage signaling-embedded clock (SLVS-EC) standards is used.

The application processor 120 executes predetermined image processing on image data.

The interface 119 includes a transmission device 200 and a reception device 300. The transmission device 200 differentially transmits serial data to the reception device 300 via a positive-side signal line 208 and a negative-side signal line 209. The reception device 300 receives serial data.

Furthermore, a positive-side capacitor 401 is inserted in the positive-side signal line 208, and a negative-side capacitor 402 is inserted in the negative-side signal line 209. By inserting these positive-side capacitor 401 and negative-side capacitor 402, AC components can be transmitted. Such a connection is, in general, referred to as AC coupling.

Note that although the SLVS-EC standards are used as the standard of the interface 119, the standard is not limited to the SLVS-EC standards as long as transmission of serial data by AC coupling is possible with the standard. For example, the low voltage differential signaling (LVDS) standard may be used.

Moreover, although the interface 119 is used for data transmission between the solid-state imaging element 110 and the application processor 120, the present technology is not limited to this configuration. The interface 119 can also be used for data transmission between circuits other than the solid-state imaging element 110 or the application processor 120. Furthermore, although the interface 119 is used for data transmission in the imaging device 100, the present technology is not limited to this configuration. As exemplified in b of the diagram, the interface 119 can also be used for data transmission between the imaging device 100 and another device or apparatus (for example, electronic control unit (ECU)).

In addition, although the transmission device 200 transmits serial data differentially, single-ended transmission can be performed instead of differential transmission.

[Configuration Example of Transmission Device]

Figure 2:
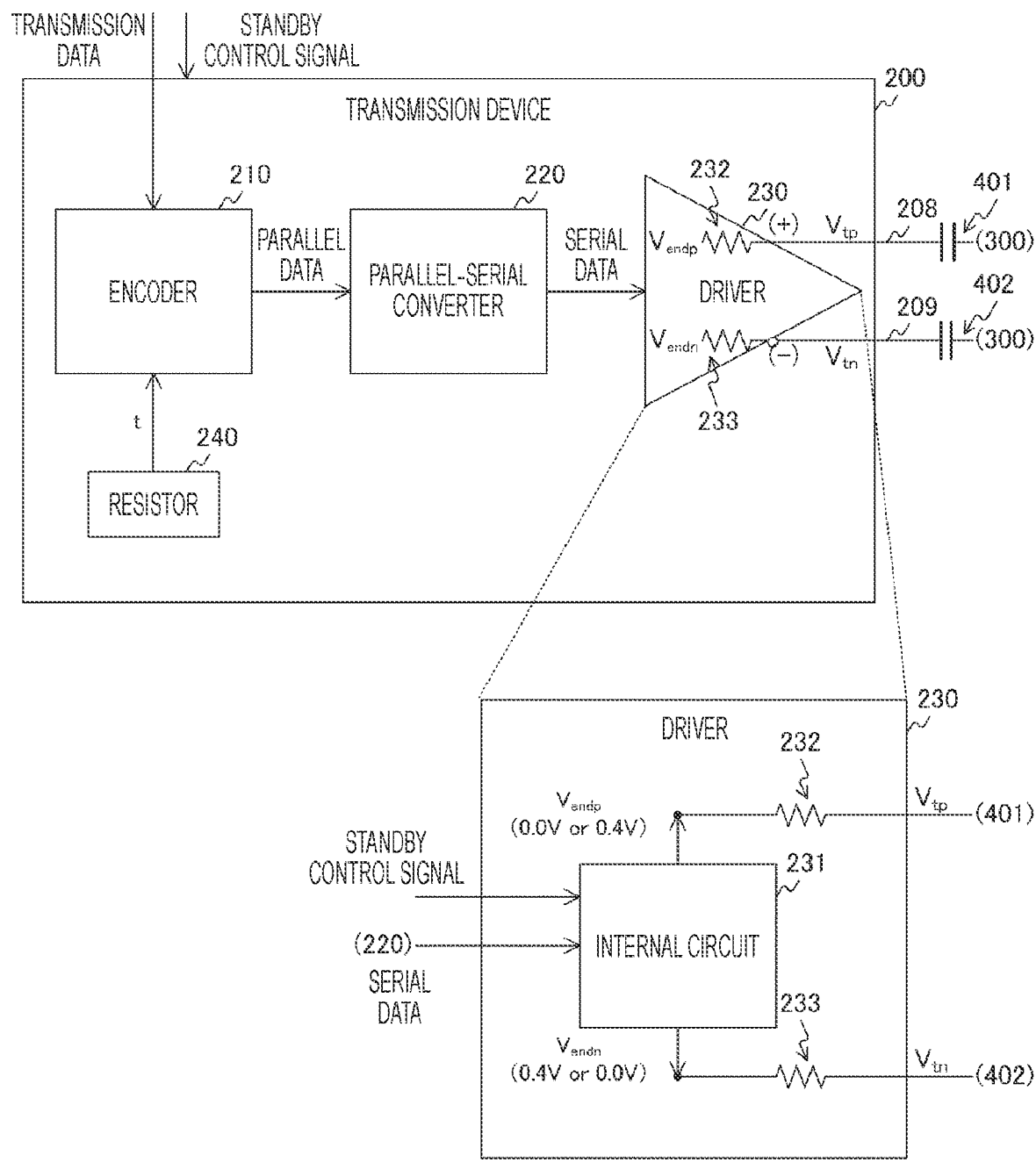
FIG. 2 is a block diagram illustrating a configuration example of a transmission device of the first embodiment of the present technology.

FIG. 2 is a block diagram illustrating a configuration example of a transmission device 200 of a first embodiment of the present technology. The transmission device 200 includes an encoder 210, a parallel-serial converter 220, a driver 230, and a register 240. Meanwhile, transmission data and a standby control signal are input to the transmission device 200. The transmission data is data to be transmitted to the reception device 300, such as image data. The standby control signal is a signal for controlling the transmission device 200 to be in a standby state in which data transmission is not performed. For example, "1" is set in the standby control signal when the standby state is set, and "0" is set in the standby control signal in a case where a state other than the standby state is set (in other words, the standby state is canceled).

The encoder 210 encodes the transmission data by using a predetermined encoding method. This transmission data is encoded into a bit string in which a logical value "1" and a logical value "0" each have the same frequency of occurrence. A clock signal is further superimposed at the time of encoding. Hereinafter, data obtained by encoding transmission data is referred to as "valid data".

The encoder 210 also acquires end timing of a stabilization period by reading, from the register 240, data indicating stabilization time t, which is the length of the stabilization period. Here, the stabilization period is a period until the amplitude of an output signal of the driver 230 reaches a predetermined specified value. The method of setting the stabilization time t will be described later.

Furthermore, when the standby control signal is set to "0" (that is, when the standby state is canceled), the encoder 210 generates, as invalid data, certain data for controlling the output of the driver 230 on the basis of the stabilization time t. Then, the encoder 210 inputs parallel data including the invalid data to the parallel-serial converter 220 and then inputs the parallel data including valid data.

The parallel-serial converter 220 converts parallel data (that is, valid data and invalid data) into serial data. The parallel-serial converter 220 inputs serial data to the driver 230. This serial data is input bit by bit in synchronization with a transmission clock signal of a predetermined frequency.

The driver 230 differentially transmits serial data to the reception device 300. This driver 230 includes an internal circuit 231, a positive-side internal resistor 232, and a negative-side internal resistor 233.

A connection node of the positive-side internal resistor and the positive-side capacitor 401 corresponds to a non-inverting output terminal (+) of the driver 230, and a connection node of the negative-side internal resistor and the negative-side capacitor 402 corresponds to an inverting output terminal (−) of the driver 230. One end of the positive-side internal resistor 232 is connected to the non-inverting output terminal (+), and another end thereof is connected to the internal circuit 231. Meanwhile, one end of the negative-side internal resistor 233 is connected to the inverting output terminal (−), and another end thereof is connected to the internal circuit 231. The potential of the non-inverting output terminal (+) is hereinafter defined as a positive-side output potential $V_{tp}$, and the potential of the inverting output terminal (−) is defined as a negative-side output potential $V_{tn}$.

The internal circuit 231 outputs one of a pair of potentials different from each other to the positive-side internal resistor 232 as a positive-side transmission end potential $V_{endp}$ and the other to the negative-side internal resistor 233 as a negative-side transmission end potential $V_{endn}$ depending on the serial data. For example, 0.4 volts (V) and 0.0 volts (V) are used as a pair of potentials.

The internal circuit 231 controls the positive-side signal lines 208 and 209 to a high impedance state when the standby control signal is set to "1" (that is, in the standby state). On the other hand, when the standby control signal is set to "0" (that is, the standby state is canceled), the internal circuit 231 outputs the positive-side transmission end potential $V_{endp}$ and the negative-side transmission end potential $V_{endn}$ depending on the serial data.

Figures 3, 4:
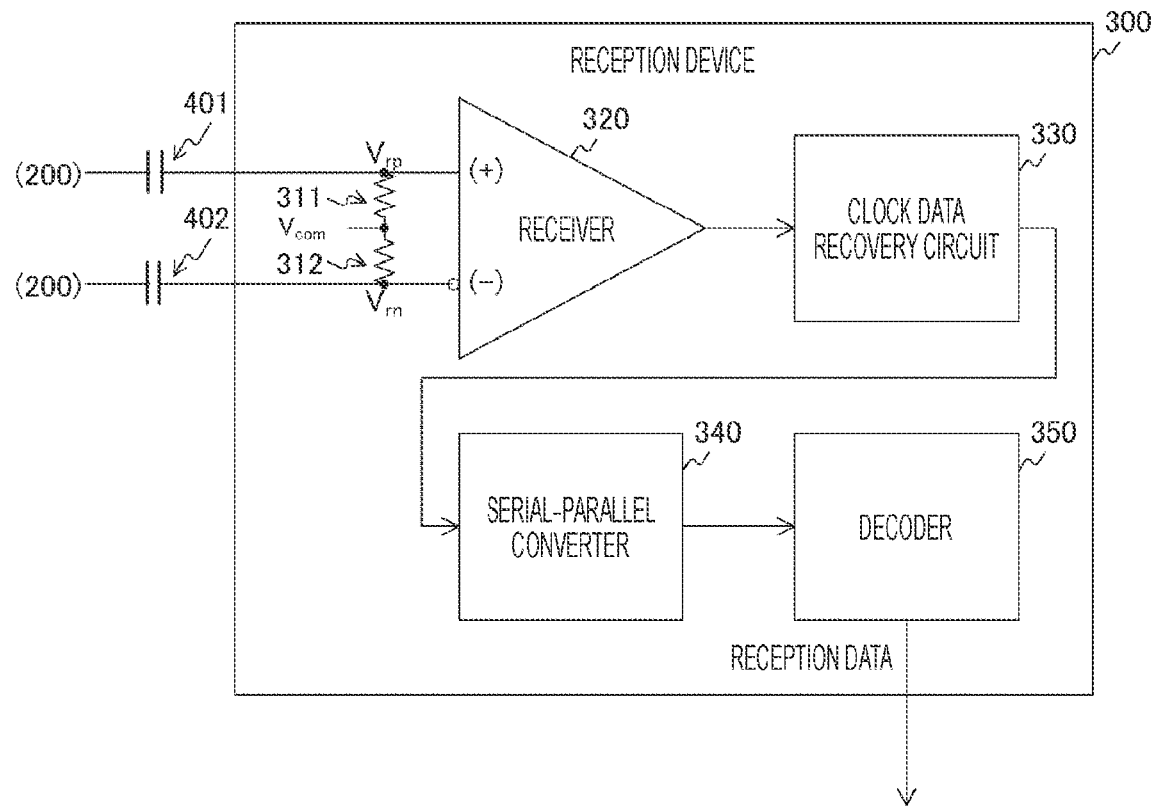
FIG. 3 is a table illustrating an example of the operation of an internal circuit of the first embodiment of the present technology.
FIG. 4 is a block diagram illustrating a configuration example of a reception device of the first embodiment of the present technology.

FIG. 3 is a table illustrating an example of the operation of the internal circuit 231 of the first embodiment of the present technology. In a case where the standby state is canceled, and serial data of a logical value of "0" is input, the internal circuit 231 of the driver 230 outputs 0.0 volts (V) as the positive-side transmission end potential $V_{endp}$ and 0.4 volts (V) as the negative-side transmission end potential $V_{endn}$.

On the other hand, in a case where serial data of a logical value of "1" is input, the internal circuit 231 of the driver 230 outputs 0.4 volts (V) as the positive-side transmission end potential $V_{endp}$ and 0.0 volts (V) as the negative-side transmission end potential $V_{endn}$.

As illustrated in the diagram, the driver 230 controls the potential difference between the positive and negative transmission end potentials to two values (for example, ±0.4 volts) and transmits serial data bit by bit in order. Such a transmission scheme is called a binary transmission scheme.

Note that the internal circuit 231 outputs 0.0 volts (V) and 0.4 volts (V); however, the value of the potential to be output is not limited to these values. Moreover, although the interface 119 uses the binary transmission scheme, a multilevel transmission scheme can also be used. In a case where a multilevel transmission scheme is used, the internal circuit 231 of the driver 230 controls the potential difference between the positive and negative transmission end potentials to three or more values and transmits serial data in units of two or more bits.

[Configuration Example of Reception Device]

FIG. 4 is a block diagram illustrating a configuration example of the reception device 300 of the first embodiment of the present technology. This reception device 300 includes a positive-side terminating resistor 311 and a negative-side terminating resistor 312, a receiver 320, a clock data recovery circuit 330, a serial-parallel converter 340, and a decoder 350.

A terminal on the reception side of the positive-side capacitor 401 is connected to a non-inverting input terminal (+) of the receiver 320, and a terminal on the reception side of the negative-side capacitor 402 is connected to an inverting input terminal (−) of the receiver 320. The potential of the non-inverting input terminal (+) is hereinafter defined as a positive-side input potential $V_{rp}$, and the potential of the inverting input terminal (−) is defined as a negative-side input potential $V_{rn}$.

Furthermore, the positive-side terminating resistor 311 is inserted between the non-inverting input terminal (+) of the receiver 320 and a common node to which a constant bias potential $V_{com}$ is applied. Meanwhile, the negative-side terminating resistor 312 is inserted between the inverting input terminal (−) of the receiver 320 and the common node.

The receiver 320 receives serial data that is differentially transmitted. This receiver 320 supplies the serial data that has been received to the clock data recovery circuit 330.

The clock data recovery circuit 330 separates the clock signal superimposed on the transmission side from the serial data. This clock data recovery circuit 330 supplies the serial data, from which the clock signal has been separated, to the serial-parallel converter 340.

The serial-parallel converter 340 converts serial data into parallel data and transmits the parallel data to the decoder 350 in parallel.

The decoder 350 decodes the parallel data by using a decoding method that matches the encoding method on the transmission side. This decoder 350 outputs the decoded data as reception data to the outside of the reception device 300.

Figure 5A:
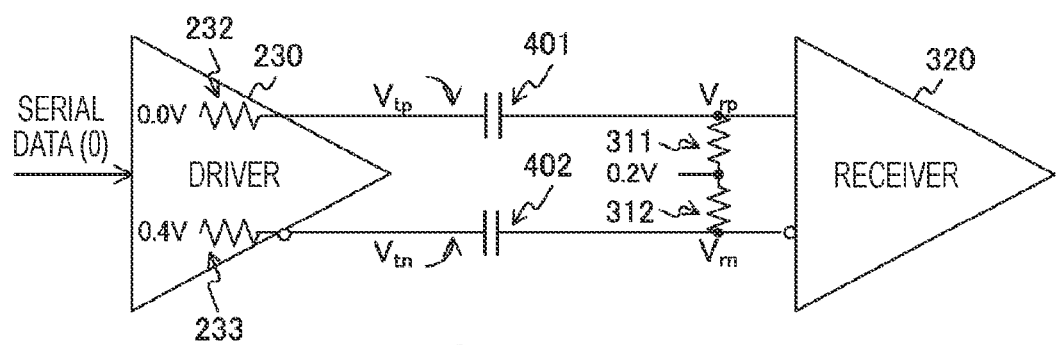
FIGS. 5A and 5B are diagrams illustrating an example of potential control in a driver of the first embodiment of the present technology.
Figure 5B:
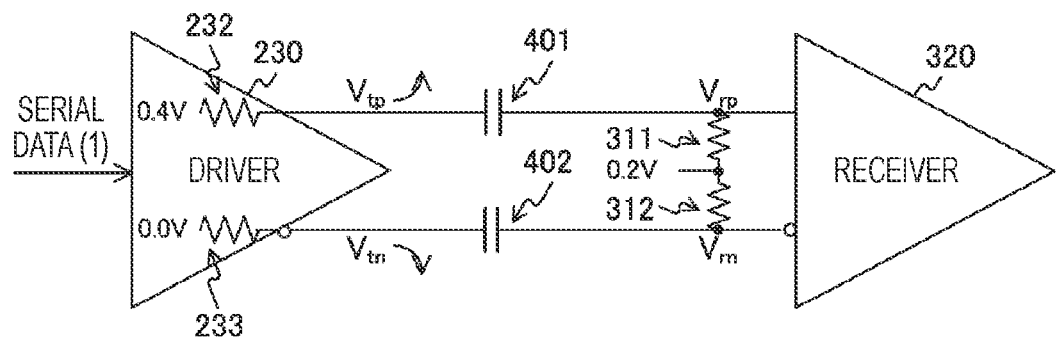

FIGS. 5A and 5B are diagrams illustrating an example of potential control in the driver of the first embodiment of the present technology. In the diagram, FIG. 5A is a diagram illustrating an example of potential control when serial data of the logical value "0" is input, and FIG. 5B is a diagram illustrating an example of potential control when serial data of the logical value "1" is input.

As exemplified in a of the diagram, the driver 230 sets an internal node of the positive-side internal resistor 232 to 0.0 volts (V) and sets an internal node of the negative-side internal resistor 233 to 0.4 volts (V) when the logical value "0" is input. With this control, the positive-side output potential $V_{tp}$ gradually decreases and the negative-side output potential $V_{tn}$ gradually increases depending on time constants. A time constant on the positive side is a value determined by the resistance values or the capacitance values of the positive-side internal resistor 232, the positive-side capacitor 401, and the positive-side terminating resistor 311. A time constant on the negative side is a value determined by the resistance values or the capacitance values of the negative-side internal resistor 233, the negative-side capacitor 402, and the negative-side terminating resistor 312.

On the other hand, as exemplified in b in the diagram, the driver 230 sets the internal node of the positive-side internal resistor 232 to 0.4 volts (V) and sets the internal node of the negative-side internal resistor 233 to 0.0 volts (V) when the logical value "1" is input. With this control, the positive-side output potential $V_{tp}$ gradually increases and the negative-side output potential $V_{tn}$ gradually decreases depending on the time constants.

FIGS. 6A and 6B are timing charts illustrating an example of fluctuations in the potential on the transmission side and serial data in the first embodiment of the present technology. In the diagram, FIG. 6A is a diagram illustrating an example of fluctuations in the positive-side output potential Vtp and the negative-side output potential Vtn on the transmission side, and FIG. 6B is a diagram illustrating an example of fluctuations in serial data.

A period until timing T0 is defined as a standby period that is in a standby state. During this standby period, the driver 230 sets the positive-side signal line 208 and the negative-side signal line 209 to a high impedance (Hi-Z).

When the standby state is canceled at timing T0, serial data of the logical value "0" is continuously input to the driver 230 over a low output period until timing T1. With this serial data, the positive-side output potential $V_{tp}$ of the driver 230 gradually drops and is fixed at 0.0 volts (V) (in other words, initialized), and the negative-side output potential $V_{tn}$ gradually rises and fixed to 0.4 volts (V) (in other words, initialized). That is, the amplitude of the output of the driver 230 is fixed to the maximum value. The low output period is set at a sufficiently long period so that the amplitude is fixed at the maximum value.

Then, the serial data is inverted to the logical value "1" at timing T1 when the low output period has elapsed, and the serial data of "1" is continuously input at and after timing T1. With this serial data, the positive-side output potential $V_{tp}$ of the driver 230 reaches a common potential (such as 0.2 volts) immediately due to the flow of a high-frequency current and then gradually rises from the common potential, and the negative-side output potential $V_{tn}$ gradually drops from the common potential. Then, at timing T2 when the stabilization time set in the register 240 has elapsed, the serial data is inverted to the logical value "0". The data up to timing T2 is treated as invalid data on the reception side. At and after timing T2, valid data is transmitted.

Here, the length of the stabilization period (that is, the stabilization time t) is set to time it takes for the positive-side output potential $V_{tp}$ and the negative-side output potential $V_{tn}$ to reach a predetermined specified value. The specified value is, for example, a value corresponding to the common potential and the amplitude specified in the SLVS-EC. In the SLVC-EC, 0.2 volts (V) is specified as the common potential, and 0.2 volts (V) is specified as the amplitude. Therefore, for example, 0.3 volts (V) and 0.1 volts (V) are used as the specified values of the positive-side output potential $V_{tp}$ and the negative-side output potential $V_{tn}$, respectively.

As described above, the time constant on the positive side is determined by the resistance values or the capacitance values of the positive-side internal resistor 232, the positive-side capacitor 401, and the positive-side terminating resistor 311. Assuming that R is a combined resistance value of the respective resistances of the positive-side internal resistor 232 and the positive-side terminating resistor 311, and C is the capacitance value of the positive-side capacitor 401, a time constant τ on the positive side can be obtained by the following equation.

$$\tau = RC$$

In the above equation, the unit of the resistance value R is, for example, ohm (Ω), and the unit of the capacitance value C is, for example, nanofarad (nF). The unit of the time constant τ is, for example, nanoseconds (ns).

Meanwhile, a value $V_{tp}(t)$ of the negative-side output potential $V_{tn}$ when t nanoseconds (ns) have elapsed from timing T1 is obtained by the following equation.

$$V_{tn}(t) = 0.2 \times \exp(-t/\tau)$$

By replacing the time constant τ in the above equation with RC and substituting the specified value of 0.1 volts (V) for $V_{tn}(t)$, about 1.6×RC nanoseconds (ns) is calculated as the stabilization time t. Assuming that the value of the time constant τ (that is, RC) is 50, data indicating, for example, 80 nanoseconds (ns) is set in the register 240 as the time t. Note that it is assumed that the time constant on the positive side is substantially the same as that on the negative side.

Then, at timing T2 when the stabilization period has elapsed, the serial data is inverted to the logical value "0". At and after this timing T2, valid data is transmitted.

The encoder 210 controls the driver 230 by generating parallel data that corresponds to the serial data described above. That is, when the standby state is canceled, 0.0 volts (V) and 0.4 volts (V) are output as the positive-side transmission end potential $V_{endp}$ and the negative-side transmission end potential $V_{endn}$ over the low output period up to timing T2. As a result, the positive-side output potential $V_{tp}$ and the negative-side output potential $V_{tn}$ are initialized to the fixed values of 0.0 volts (V) and 0.4 volts (V).

Then, the encoder 210 transitions the positive-side transmission end potential $V_{endp}$ and the negative-side transmission end potential $V_{endn}$ to 0.4 volts (V) and 0.0 volts (V) and continuously outputs those potentials over the stabilization time t set in the register 240. As a result, the positive-side output potential $V_{tp}$ and the negative-side output potential $V_{tn}$ reach the specified values of 0.3 volts (V) and 0.1 volts (V) at timing T2. Then, the encoder 210 transitions the positive-side transmission end potential $V_{endp}$ and the negative-side transmission end potential $V_{endn}$ to 0.0 volts (V) and 0.4 volts (V) at timing T2. Note that the encoder 210 is an example of the transmission-side control unit described in the claims.

In addition, the register 240 stores data indicating the length of the stabilization period (that is, the stabilization time t) and supplies the data to the encoder 210. Therefore, the encoder 210 can acquire timing T2 on the basis of this data. In a case of direct current (DC) coupling, it is only required to minimize the stabilization time t. With this configuration of setting in the register 240 in this manner, there are advantages that there is no need to add a circuit to the driver 230 or on the reception side and that the encoder 210 is only required to generate digital parallel data. Note that the register 240 is an example of the timing supply unit described in the claims.

Let us consider a case where the above control is implemented in the interface 119 conforming to the SLVS-EC standards. In this case, for example, it is only required to insert a high period (stabilization period) that is fixed to the data of the logical value "1" between the low output period that is fixed to the data of the logical value "0" and a training sequence period. In addition, the register 240 that sets the stabilization time t is added to an attribute register of the standards. Furthermore, in Table 2 of the SLVS-EC standards, for example, it is sufficient to describe as follows.

Register: Stabilize Length
Description: Set the differential High output period follow after the differential Low output period during mode change and initialization
Unit: SI
Range: 1 to 4095
Default: 400

"Stabilize Length" represents the length of the stabilization period (stabilization time) in the diagram. "Differential high output period" represents the stabilization period in the diagram. "Differential low output period" represents the low output period in the diagram. Note that the capacitance of the AC coupling is set to 10 nanofarads (nF) by default, and it is assumed that the maximum usage range is up to 100 nanofarads (nF).

Figure 7:
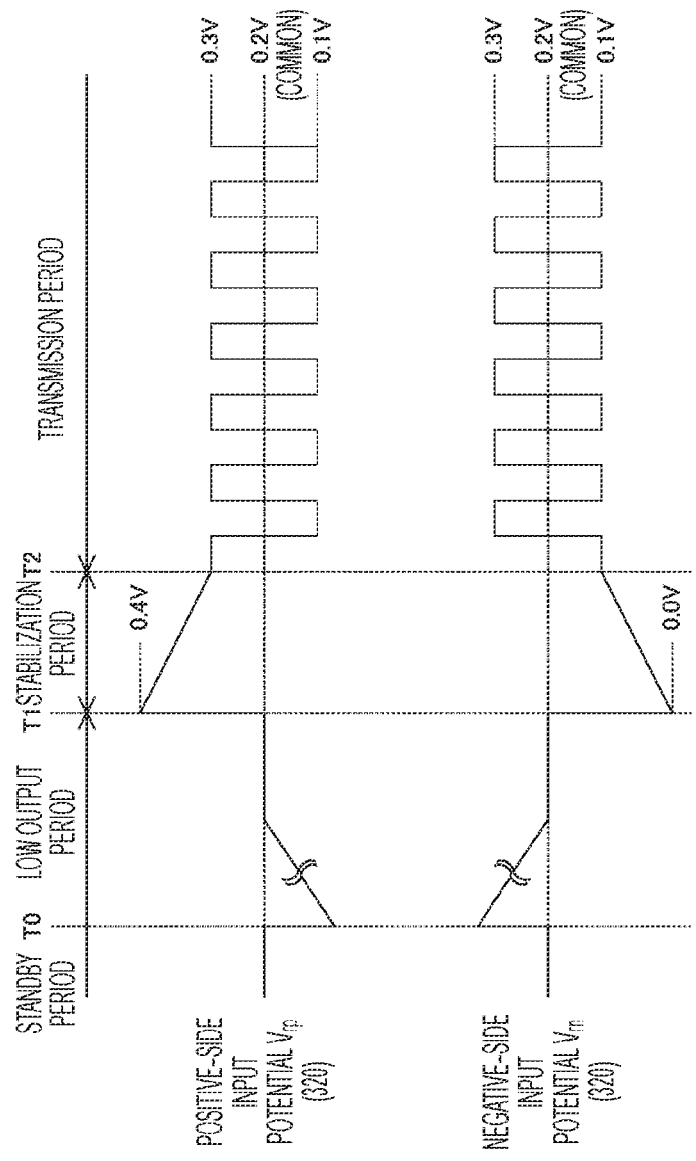
FIG. 7 is a timing chart illustrating an example of fluctuations in the potential on a reception side in the first embodiment of the present technology.

FIG. 7 is a timing chart illustrating an example of fluctuations in the potential on the reception side in the first embodiment of the present technology. When the standby state is canceled at timing T0, the positive-side input potential $V_{rp}$ and the negative-side input potential $V_{rn}$ of the receiver 320 gradually fluctuate and converge to the common potential on the reception side over the low output period up to timing T1.

Then, over the stabilization period of timing T1 to timing T2, the positive-side input potential $V_{rp}$ of the receiver 320 immediately reaches a potential that is shifted by 0.2 volts from the common potential due to the flow of a high-frequency current and then gradually drops, and the negative-side output potential $V_{tn}$ gradually rises. Then, at timing T2, the positive-side input potential $V_{rp}$ and the negative-side input potential $V_{rn}$ reach the specified values of 0.1 volts (V) and 0.3 volts (V).

Since the amplitude of the output of the driver 230 stabilizes at the specified values at and after timing T2, the receiver 320 can receive valid data.

Here, let us assume a comparative example in which the logical values "1" and "0" are alternately input to the driver 230 during the stabilization period.

Figures 8A, 8B:
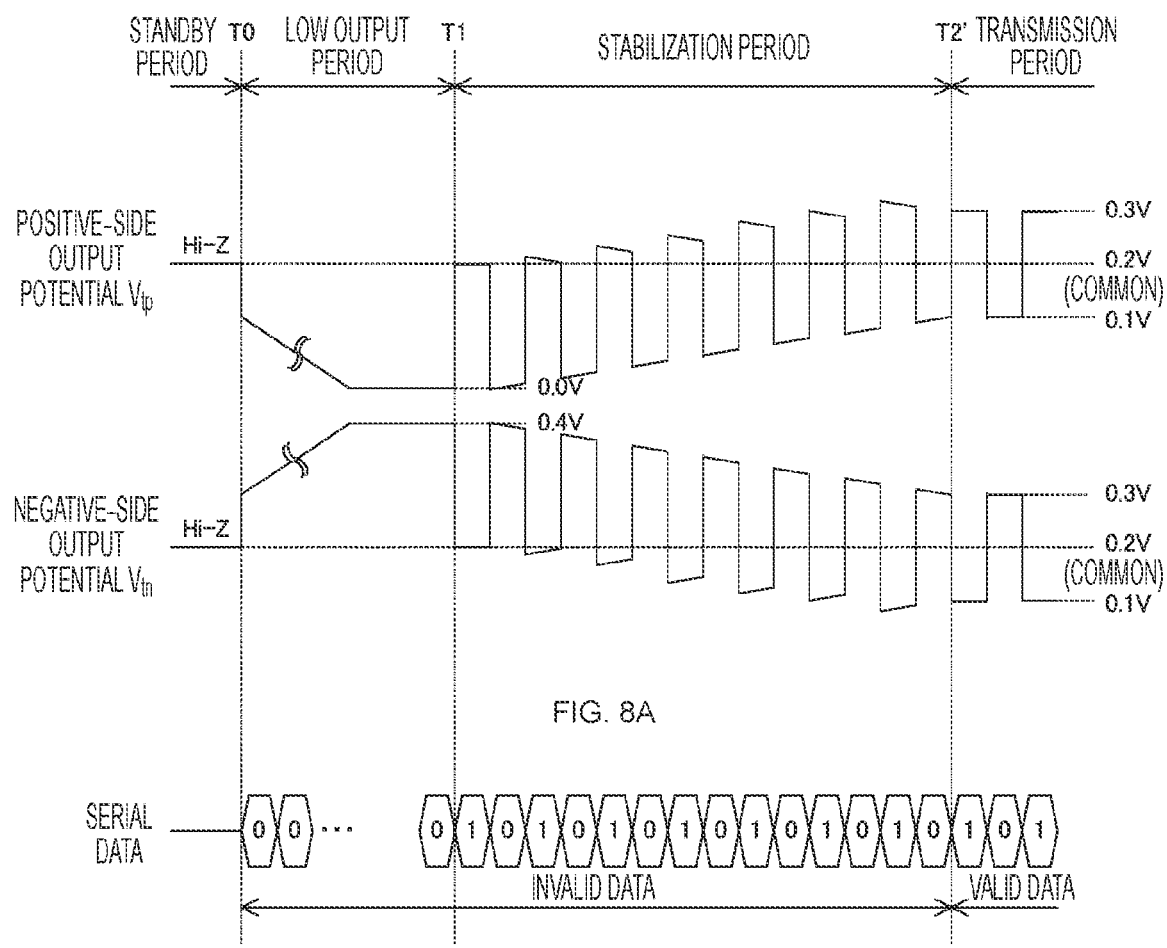
FIGS. 8A and 8B are timing charts illustrating an example of fluctuations in the potential on a transmission side and serial data in a comparative example.

FIGS. 8A and 8B are timing charts illustrating an example of fluctuations in the potential on the transmission side and serial data in a comparative example. In the diagram, FIG. 8A is a diagram illustrating an example of fluctuations in a positive-side output potential Vtp and a negative-side output potential Vtn of the comparative example, and FIG. 8B is a diagram illustrating an example of fluctuations in serial data of the comparative example.

In this comparative example, it is assumed that the control of the driver 230 up to timing T1 when the low output period elapses is similar to the control exemplified in FIGS. 6A and 6B.

However, over the stabilization period from timing T1 to timing T2', serial data of the logical value "1" and serial data of the logical value "0" are alternately input at every predetermined pulse period. With such serial data, the positive-side output potential $V_{tp}$ and the negative-side output potential $V_{tn}$ of the driver 230 repeatedly rise and drop, and the amplitudes thereof stabilize at the specified values after the stabilization period elapses.

Figure 9:
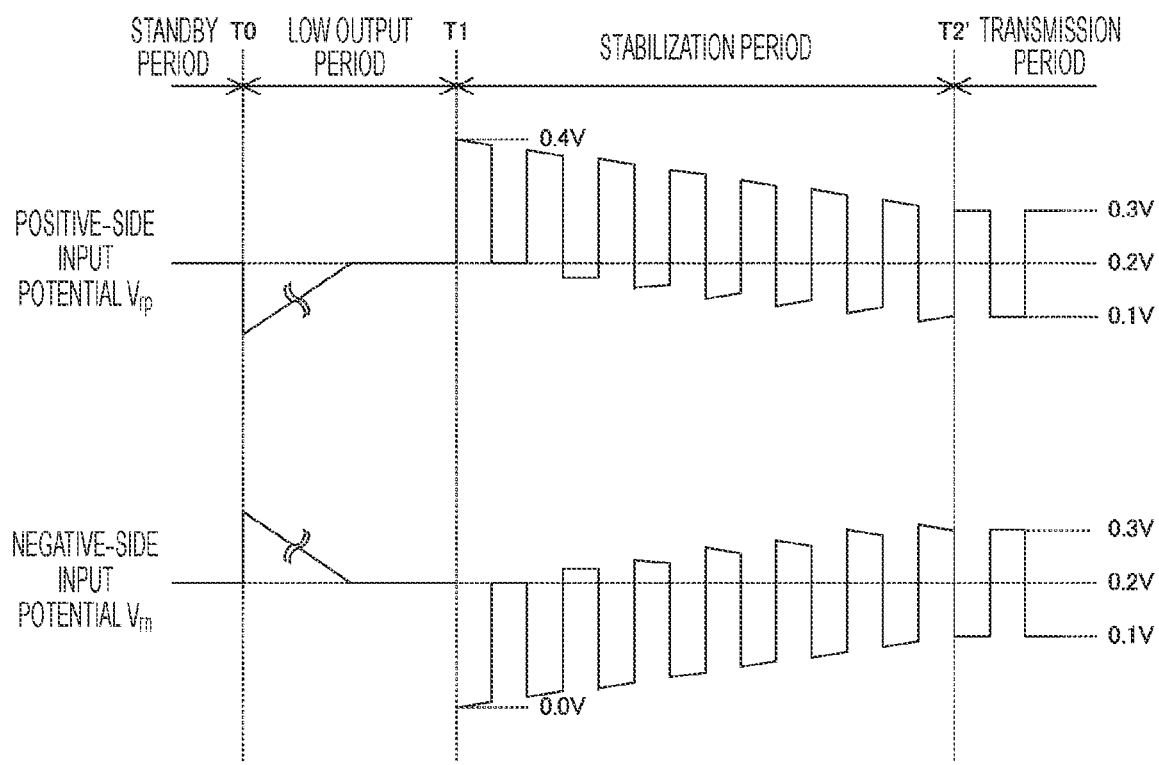
FIG. 9 is a timing chart illustrating an example of fluctuations in the potential on a reception side in the comparative example.

FIG. 9 is a timing chart illustrating an example of fluctuations in the potential on a reception side in the comparative example. Like on the transmission side, the positive-side input potential $V_{rp}$ and the negative-side input potential $V_{rn}$ of the receiver 320 repeatedly rise and drop during the stabilization period, and the amplitudes thereof stabilize at the specified values after the stabilization period elapses.

In the comparative example illustrated in FIGS. 8A, 8B, and 9, the transition of the positive-side output potential Vtp and the negative-side output potential Vtn is repeated, and thus the positive-side capacitor 401 and the negative-side capacitor 402 alternately repeat charging and discharging. In this configuration, the stabilization period is relatively long, for example, about 8 × RC nanoseconds (ns). Assuming that the value of the time constant T (that is, RC) is 50, the length of the stabilization period is 400 nanoseconds (ns).

On the other hand, in the control exemplified in FIGS. 6A, 6B, and 7, the positive-side output potential Vtp and the negative-side output potential Vtn continuously rise and drop over the stabilization period, and thus the positive-side capacitor 401 and the negative-side capacitor 402 can be continuously charged (or discharged). As a result, the stabilization time t until the start of transmission of valid data can be shortened to 80 nanoseconds (ns) in comparison with the comparative example in which the charging and discharging of the capacitors are alternately repeated to gradually bring the output potentials of the driver closer to the specified values. Moreover, since a sufficient differential amplitude is ensured from the stabilization period, the receiver 320 can wait for valid data from the stabilization period.

Note that the stabilization period can be shortened also by control in which the transmission paths are not brought to a high impedance but to an intermediate potential between 0.0 volts and 0.4 volts in the standby state. However, in order to implement this control, it is necessary to add a circuit that drives an intermediate potential. Including this circuit increases the circuit area or a parasitic capacitance, and thus it is not preferable to perform the control to bring to an intermediate potential in the standby state.

[Operation Example of Transmission Device]

Figure 10:
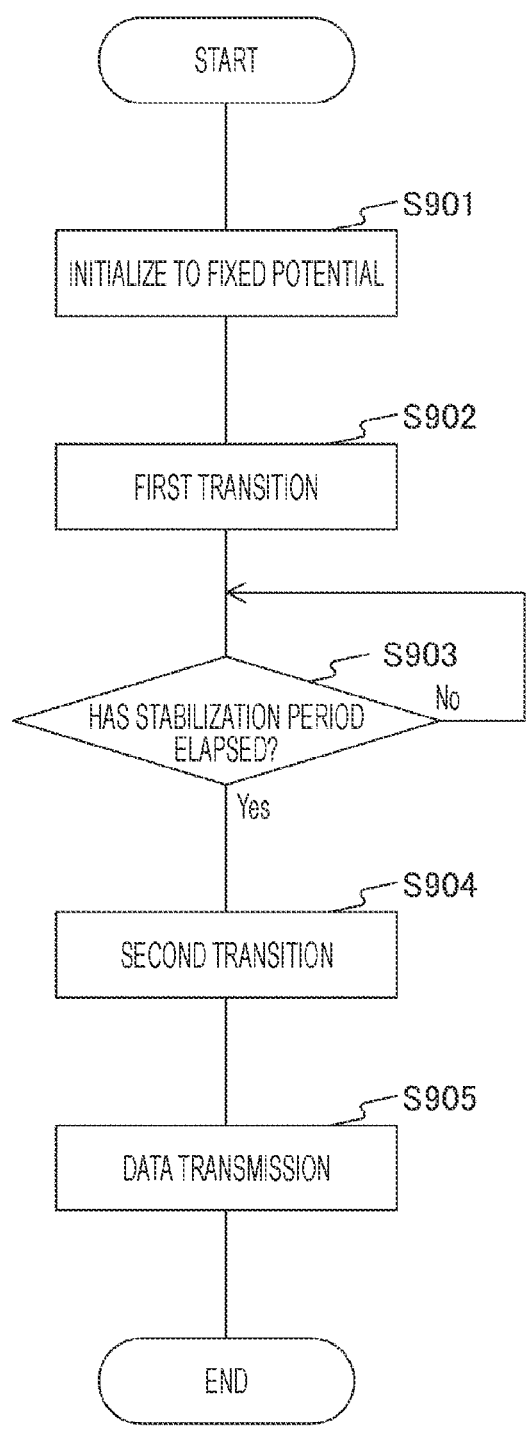
FIG. 10 is a flowchart illustrating an example of the operation of the transmission device of the first embodiment of the present technology.

FIG. 10 is a flowchart illustrating an example of the operation of the transmission device 200 of the first embodiment of the present technology. This operation is started, for example, when the standby state is canceled. The transmission device 200 fixes (initializes) the positive-side output potential $V_{tp}$ and the negative-side output potential $V_{tn}$ of the driver 230 to fixed potentials (for example, 0.0 volts and 0.4 volts) (step S901). Then, the transmission device 200 performs first transition of the transmission end potentials. As a result, the positive-side transmission end potential $V_{endp}$ and the negative-side transmission end potential $V_{endn}$ are controlled to, for example, 0.4 volts and 0.0 volts (step S902).

The transmission device 200 determines whether or not the stabilization period set in the register 240 has elapsed (step S903). If the stabilization period has not elapsed (step S903: No), the transmission device 200 repeats step S903.

On the other hand, if the stabilization period has elapsed (step S903: Yes), the transmission device 200 performs second transition of the transmission end potentials. As a result, the positive-side transmission end potential $V_{endp}$ and the negative-side transmission end potential $V_{endn}$ are controlled to, for example, 0.4 volts and 0.0 volts (step S904). Then, the transmission device 200 transmits valid data (step S905). After step S905, the transmission device 200 transitions to the standby state and ends the operation for transmission.

As described above, in the first embodiment of the present technology, the transmission device 200 outputs a constant transmission end potential until the output potentials of the driver 230 reach specified values after initialization, it is possible to continuously charge (or discharge) the AC-coupled capacitors. As a result, the stabilization period can be shortened in comparison with the control in which the charging and discharging of the capacitors are alternately repeated and the output potentials of the driver are gradually brought closer to specified values.

2. Second Embodiment

In the first embodiment described above, the length of the stabilization time t is calculated in advance and set in the register 240. However, since the value of the time constant RC is often different for each system, it is necessary to calculate the value for every system and set the value in the register 240. This second embodiment is different from the first embodiment in that a comparator is added and that the need for calculation and setting of stabilization time t is thereby eliminated.

Figure 11:
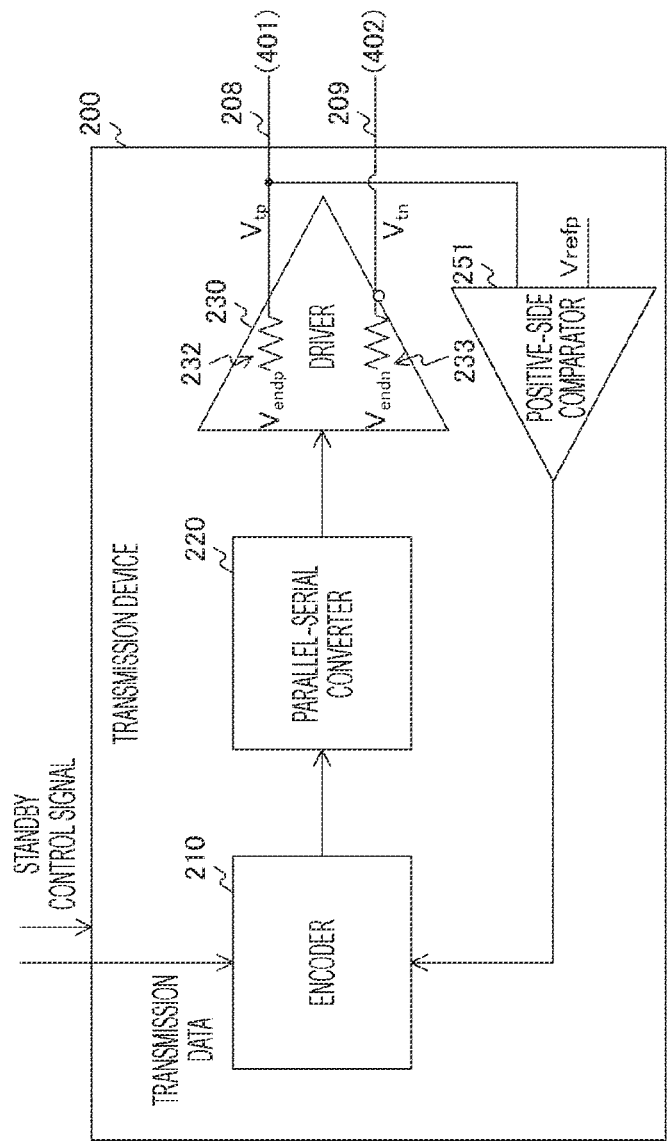
FIG. 11 is a block diagram illustrating a configuration example of a transmission device of a second embodiment of the present technology.

FIG. 11 is a block diagram illustrating a configuration example of a transmission device 200 of a second embodiment of the present technology. The transmission device 200 of this second embodiment is different from the first embodiment in that a positive-side comparator 251 is included instead of the register 240.

The positive-side comparator 251 compares the positive-side output potential $V_{tp}$ with a positive-side reference potential $V_{refp}$ that is the same as a specified value (such as 0.1 volts). This positive-side comparator 251 supplies the comparison result to the encoder 210. Note that the positive-side comparator 251 is an example of the timing supply unit described in the claims.

The encoder 210 of the second embodiment transitions the positive-side transmission end potential $V_{endp}$ and the negative-side transmission end potential $V_{endn}$ to 0.4 volts (V) and 0.0 volts (V) after initialization. Then, the encoder 210 transitions the positive-side transmission end potential $V_{endp}$ and the negative-side transmission end potential $V_{endn}$ to 0.0 volts (V) and 0.4 volts (V) at timing when the comparison result is inverted.

With the addition of the positive-side comparator 251, the encoder 210 can acquire the end timing of the stabilization period, thereby eliminating the need of calculating and setting a time constant RC for every system.

Figure 12:
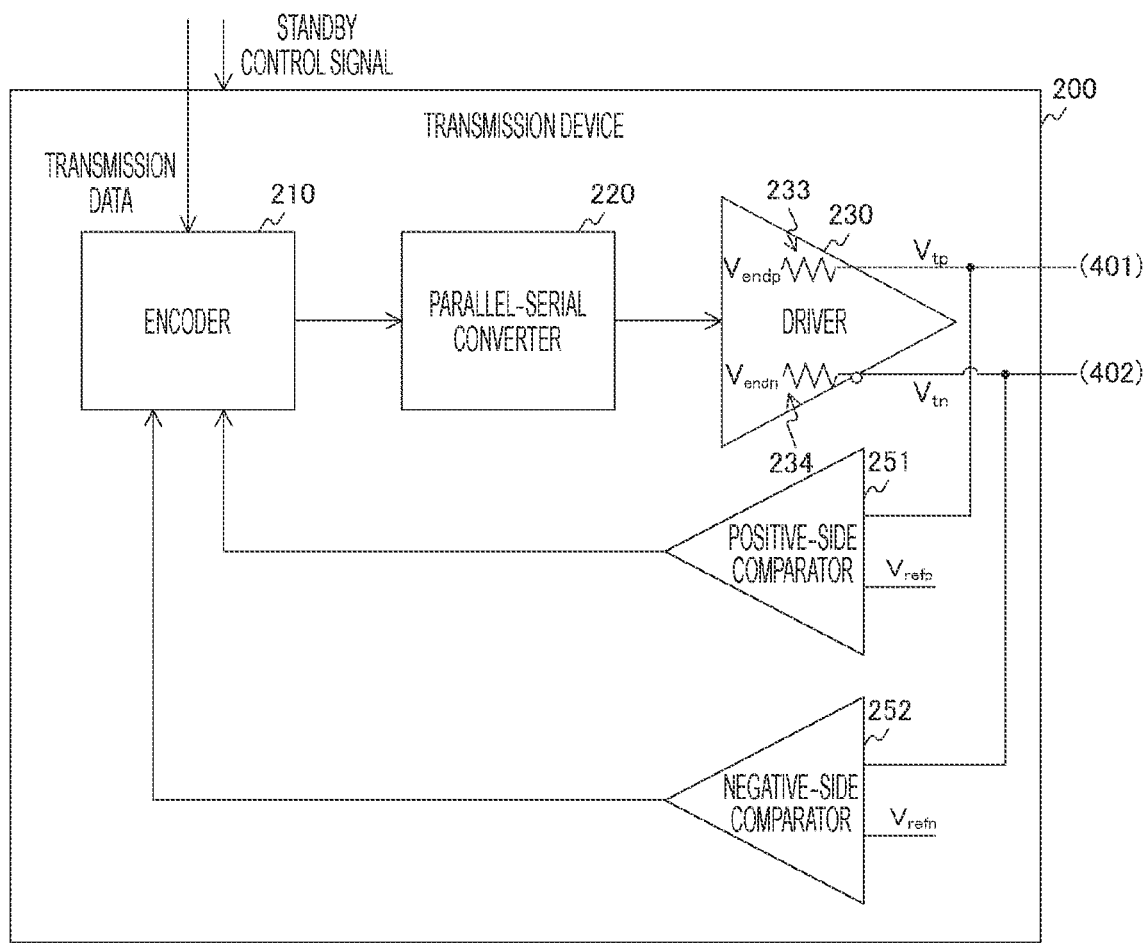
FIG. 12 is a block diagram illustrating a configuration example of a transmission device in which a comparator is included also on a negative side in the second embodiment of the present technology.

Note that although the comparator is included on the positive side, the comparator may be included on the negative side instead of the positive side. Furthermore, although the comparator is included only on the positive side, a comparator (negative-side comparator 252 in the diagram) may be included also on the negative side in addition to the positive side as exemplified in FIG. 12.

As described above, according to the second embodiment of the present technology, since the positive-side comparator 251 that compares the positive-side output potential $V_{tp}$ and a specified value is included, there is no need to set a time constant RC for each system.

3. Third Embodiment

In the first embodiment described above, the length of the stabilization time t is calculated in advance and set in the register 240 in the transmission device 200. However, the value of a time constant RC is often different for each system. Therefore, it is necessary to calculate the value for every system and set the value in the register 240. This second embodiment is different from the first embodiment in that addition of a comparator or switches eliminates the need of calculation and setting of the stabilization time t.

Figure 13:
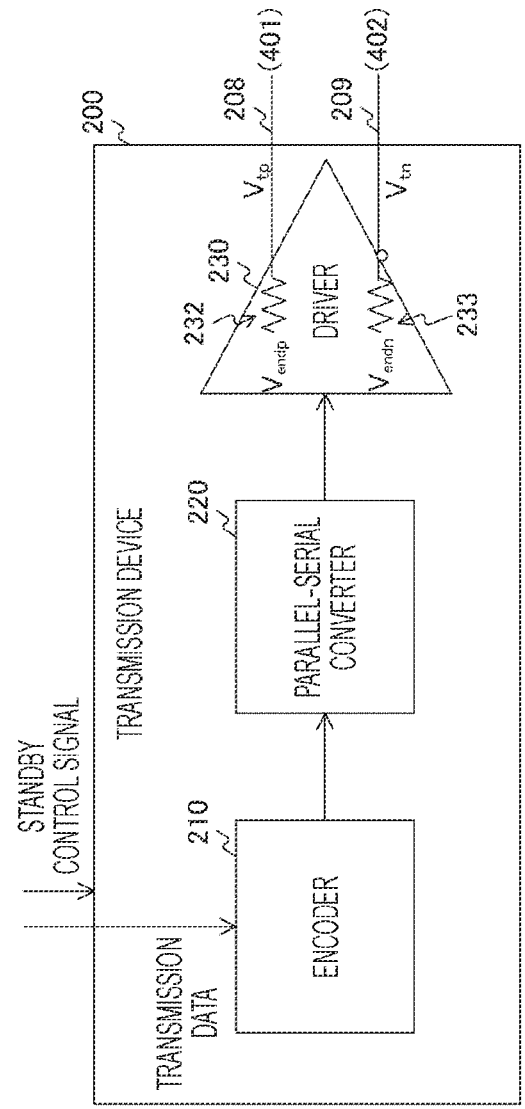
FIG. 13 is a block diagram illustrating a configuration example of a transmission device of a third embodiment of the present technology.

FIG. 13 is a block diagram illustrating a configuration example of a transmission device 200 of a third embodiment of the present technology. The transmission device 200 of this third embodiment is different from the first embodiment in that the register 240 is not included. The control method of the driver 230 according to the third embodiment will be described later.

Figure 14:
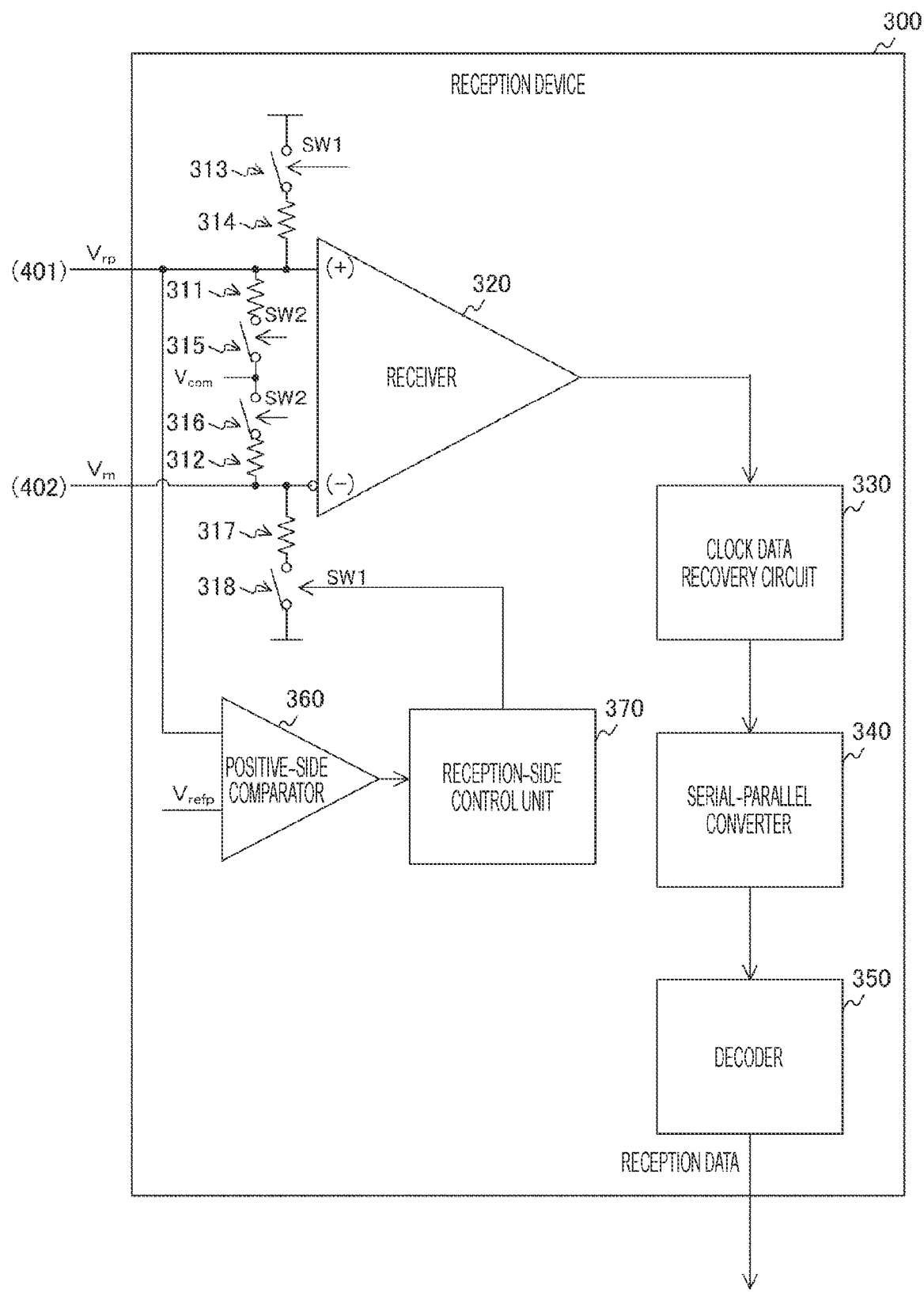
FIG. 14 is a block diagram illustrating a configuration example of a reception device of the third embodiment of the present technology.

FIG. 14 is a block diagram illustrating a configuration example of the reception device 300 of the third embodiment of the present technology. The reception device 300 of this third embodiment is different from the first embodiment in that switches 313, 315, 316, and 318, a power-supply-side resistor 314, a ground-side resistor 317, a positive-side comparator 360, and a reception-side control unit 370 are further included.

The power-supply-side resistor 314 is inserted between a non-inverting input terminal (+) of a receiver 320 and the switch 313. The ground-side resistor 317 is inserted between an inverting input terminal (−) of the receiver 320 and the switch 318.

The switch 313 opens and closes a path between the power-supply-side resistor 314 and a power supply terminal in accordance with a control signal SW1. The switch 315 opens and closes a path between a positive-side terminating resistor 311 and a common node in accordance with a control signal SW2. The switch 316 opens and closes a path between the common node and a negative-side terminating resistor 312 in accordance with the control signal SW2. The switch 318 opens and closes a path between the ground-side resistor 317 and a terminal having a predetermined reference potential (for example, ground potential) in accordance with the control signal SW1.

The positive-side comparator 360 compares the potential of the non-inverting input terminal (+) (positive-side input potential $V_{rp}$) with a predetermined positive-side reference potential $V_{refp}$ which is higher than a common potential. This positive-side comparator 360 supplies the comparison result to the reception-side control unit 370.

The reception-side control unit 370 controls each of the switches 313, 315, 316 and 318 on the basis of the comparison result.

Note that although the comparator is included on the positive side, the comparator may be included on the negative side instead of the positive side. Furthermore, although the comparator is included only on the positive side, a comparator may be included also on the negative side in addition to the positive side.

Figure 15A:
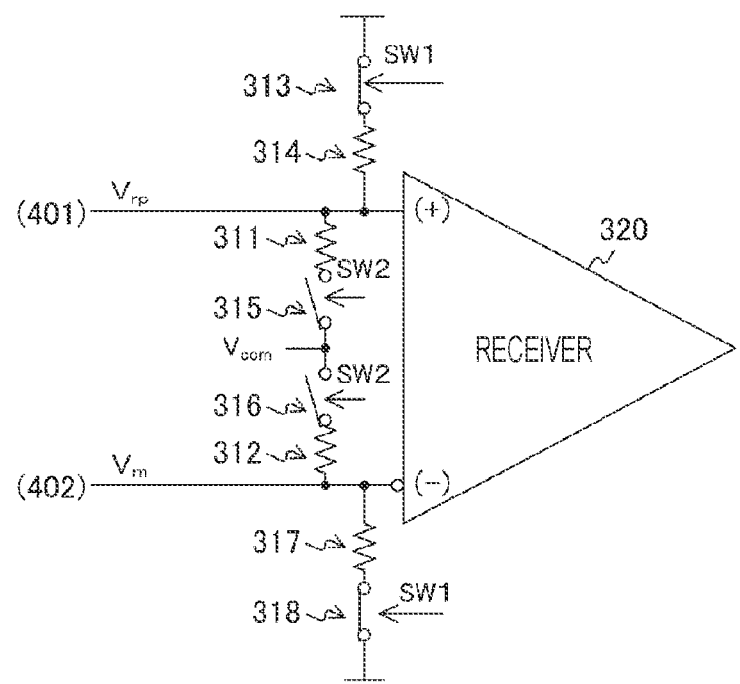
FIGS. 15A and 15B are diagrams illustrating an example of control on a reception side in the third embodiment of the present technology.
Figure 15B:
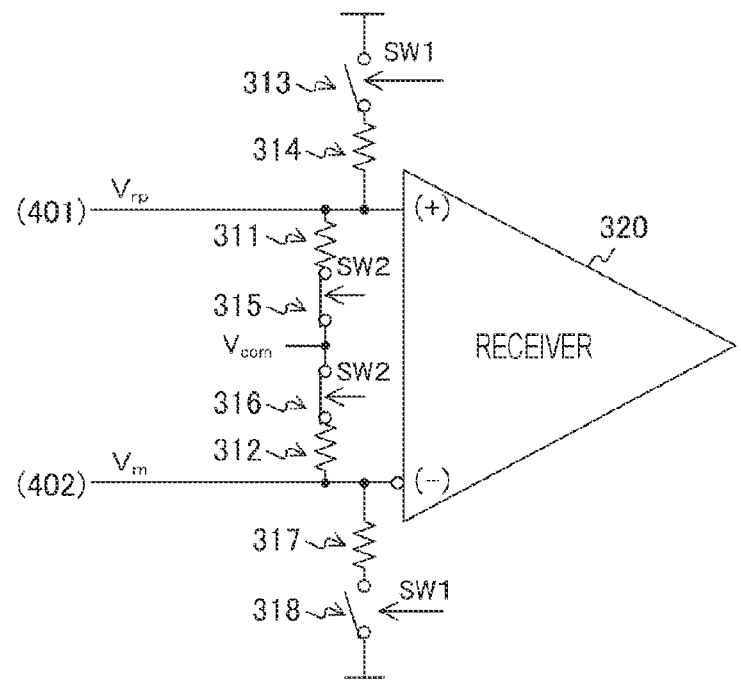

FIGS. 15A and 15B are diagrams illustrating an example of control on the reception side in the third embodiment of the present technology. In the diagram, FIG. 15A is a diagram illustrating an example of a circuit of the reception device 300 in a state where the positive-side input potential Vrp and the negative-side input potential Vrn are fixed (in other words, initialized) at the same potential as those of the transmission side. In the diagram, FIG. 15B is a diagram illustrating an example of the circuit of the reception device 300 in a state where the fixation of the potential is canceled.

When a standby state is canceled, the reception-side control unit 370 closes the switches 313 and 318 and opens the switches 315 and 316 by the control signals SW1 and SW2 as exemplified in a in the diagram. As a result, the positive-side input potential $V_{rp}$ and the negative-side input potential $V_{rn}$ are fixed at the same potential as those of the transmission side (such as 0.4 volts and 0.0 volts). Since the positive-side terminating resistor 311 and the negative-side terminating resistor 312 are separated by the switches 315 and 316, it is possible to prevent unnecessary current from flowing through these resistors in the state of fixed potentials.

Then, after a low output period has elapsed, a comparison result is inverted at timing when the transmission device 200 outputs first valid data. At the timing of this inversion, the reception-side control unit 370 opens the switches 313 and 318 and closes the switches 315 and 316 as exemplified of b of the diagram. As a result, the fixation of potentials is canceled. Thereafter, the state of b in the diagram continues.

Figures 16A, 16B:
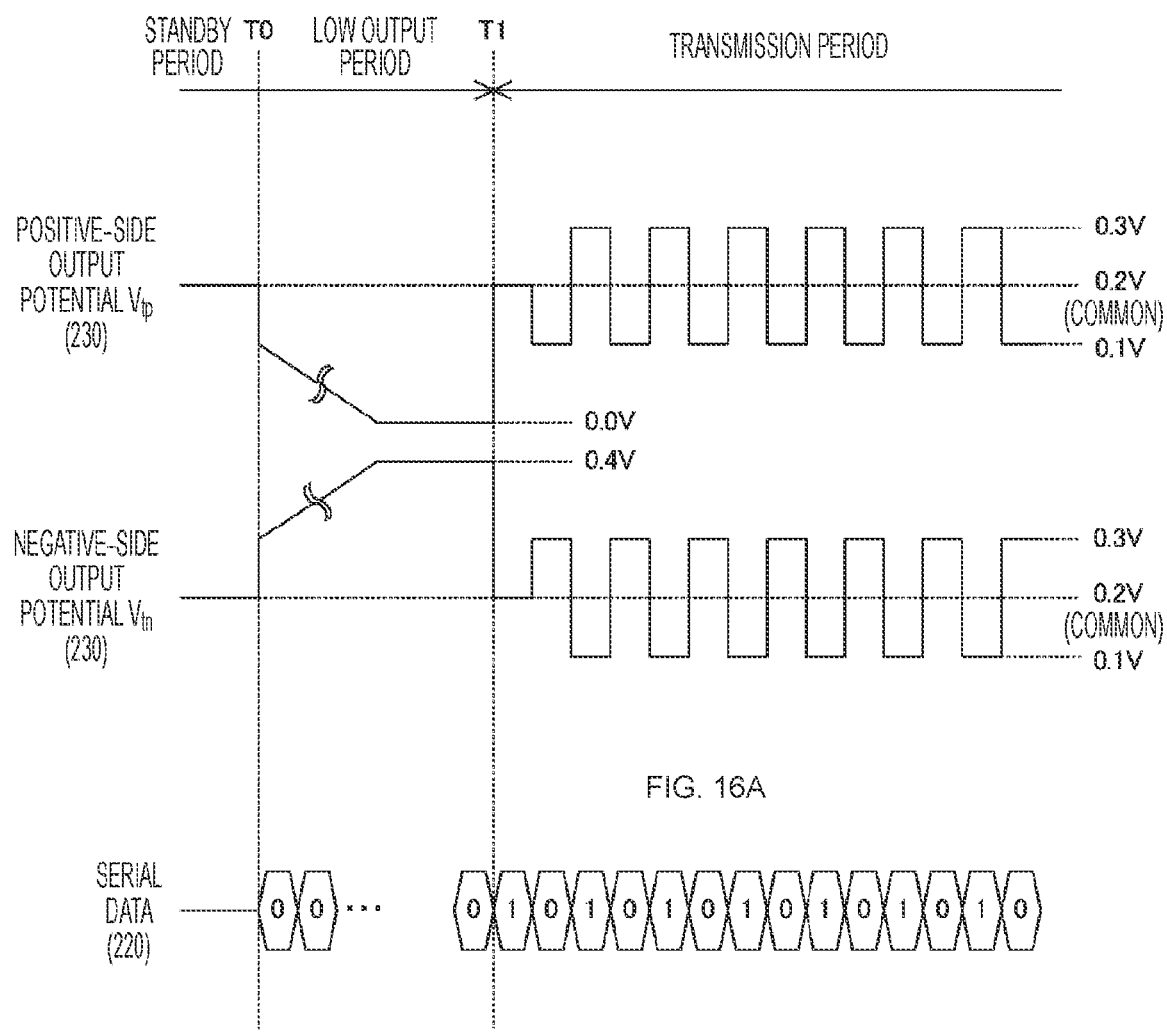
FIGS. 16A and 16B are timing charts illustrating an example of fluctuations in the potential on a transmission side and serial data in the third embodiment of the present technology.

FIGS. 16A and 16B are timing charts illustrating an example of fluctuations in the potential on the transmission side and serial data in the third embodiment of the present technology. In the diagram, FIG. 16A is a diagram illustrating an example of fluctuations in the positive-side output potential Vtp and the negative-side output potential Vtn on the transmission side, and FIG. 16B is a diagram illustrating an example of fluctuations in serial data.

It is assumed that the control of the second embodiment up to timing T1 when the low output period elapses is similar to the control of the first embodiment exemplified in FIGS. 6A and 6B. Then, at and after timing T1, the transmission device 200 transmits the serial data in which transmission data is encoded.

Figure 17:
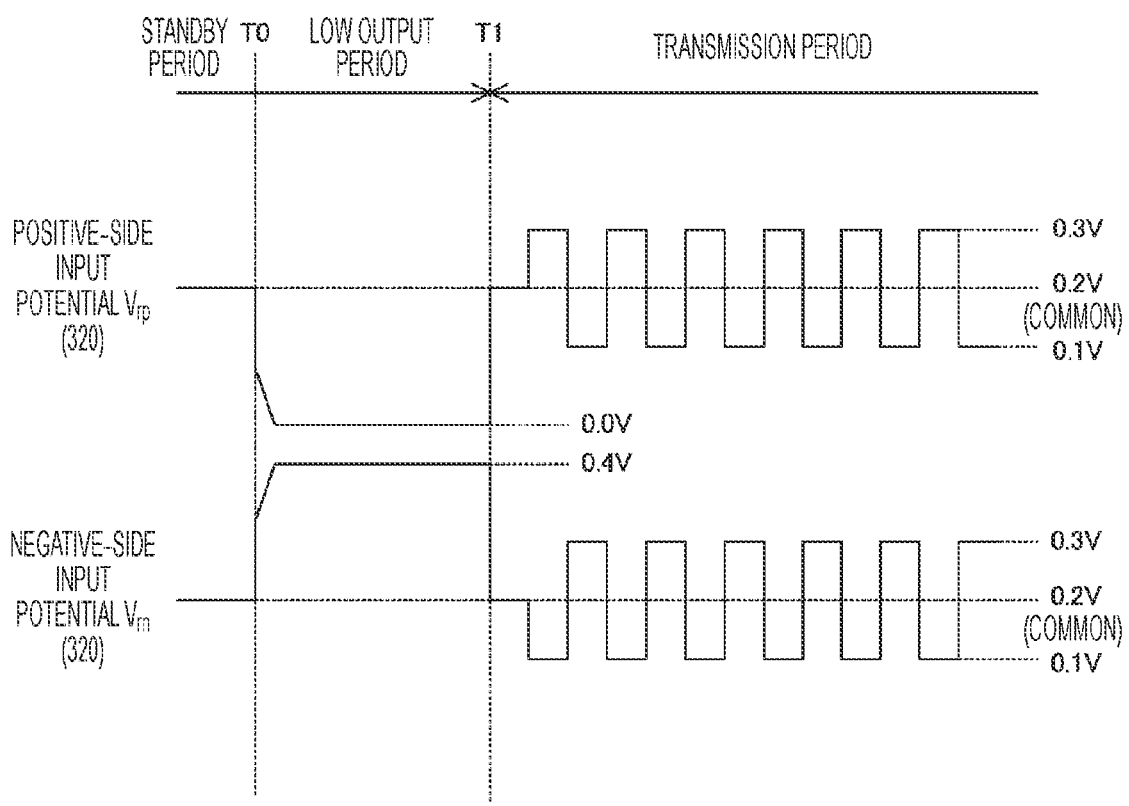

FIG. 17 is a timing chart illustrating an example of fluctuations in the potential on the reception side in the first embodiment of the present technology. When the standby state is canceled at timing T0, the reception-side control unit 370 fixes the positive-side input potential $V_{rp}$ and the negative-side input potential $V_{rn}$ to the same potential as those of the transmission side (such as 0.0 volts and 0.4 volts) by the control signals SW1 and SW2.

At timing T1 when the low output period elapses, the transmission device 200 performs first transition on the transmission end potential. As a result, the comparison result of the positive-side comparator 360 is inverted. The reception-side control unit 370 cancels the fixation of potential by the control signals SW1 and SW2 at the timing T1 when the comparison result is inverted. As a result, the potential becomes the same on the transmission side and the reception side immediately after timing T1 when the low output period elapses, and the amplitude becomes stable. Furthermore, since a sufficient differential amplitude is ensured from the beginning, the receiver 320 can receive data immediately after timing T1.

Note that, unlike the first and second embodiments, it is not necessary to modify the control conforming to the SLVS-EC standards in the third embodiment.

As described above, according to the third embodiment of the present technology, the reception device 300 fixes the positive-side input potential $V_{rp}$ and the negative-side input potential $V_{rn}$ to the same potential as those of the transmission side, and thus the stabilization period can be shortened as compared with a case where they are not fixed.

4. Exemplary Application to Mobile Object

The technology according to the present disclosure (present technology) can be applied to various products. For example, the technology according to the present disclosure may be implemented as a device mounted on a mobile object of one of types such as automobiles, electric vehicles, hybrid electric vehicles, motorcycles, bicycles, personal mobility, airplanes, drones, ships, or robots.

Figure 18:
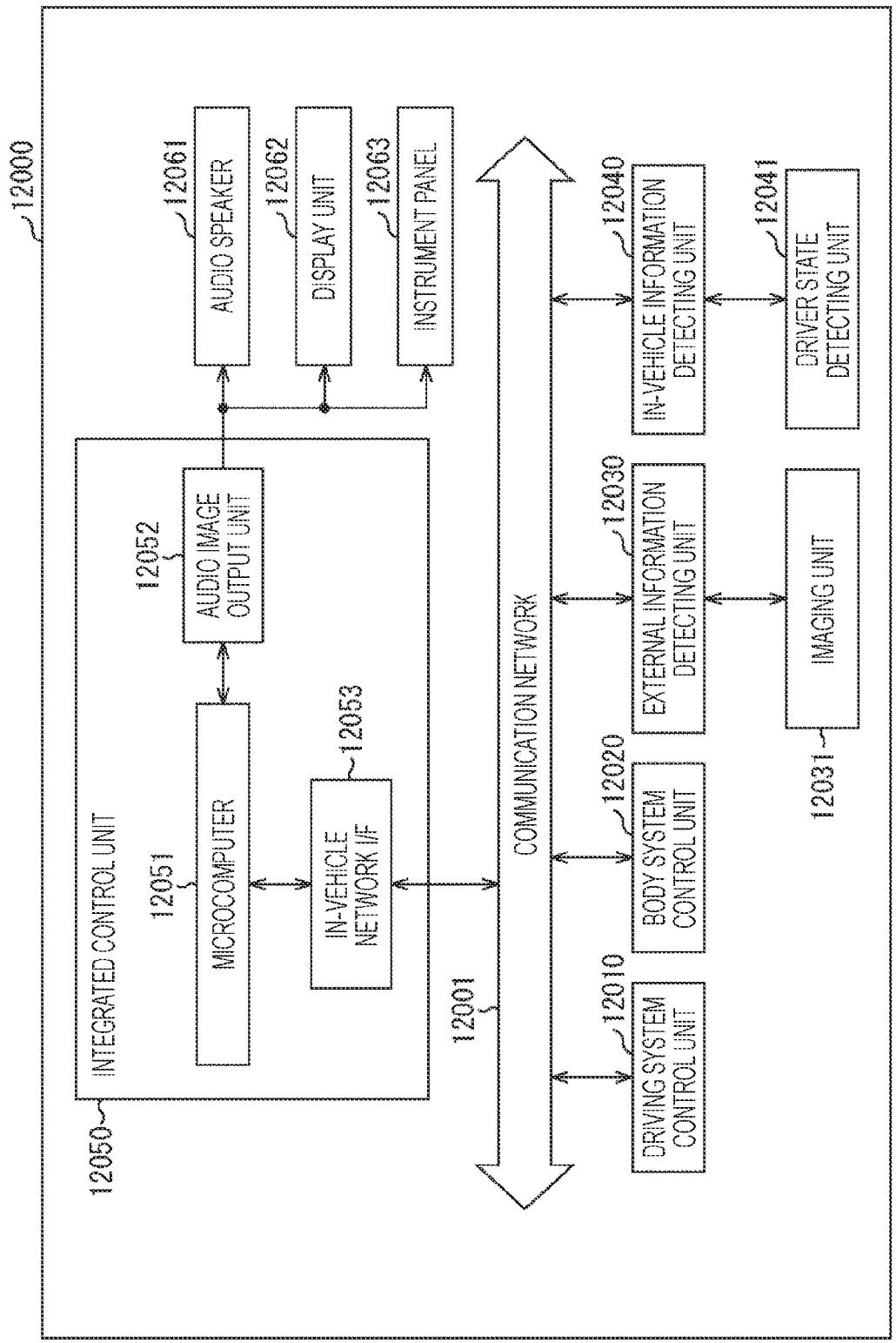

FIG. 18 is a block diagram illustrating a schematic configuration example of a vehicle control system, which is an example of a mobile object controlling system to which the technology according to the present disclosure can be applied.

A vehicle control system 12000 includes a plurality of electronic control units connected via a communication network 12001. In the example illustrated in FIG. 18, the vehicle control system 12000 includes a driving system control unit 12010, a body system control unit 12020, an external information detecting unit 12030, an in-vehicle information detecting unit 12040, and an integrated control unit 12050. As the functional configuration of the integrated control unit 12050, a microcomputer 12051, an audio image output unit 12052, and an in-vehicle network interface (I/F) 12053 are further illustrated.

The driving system control unit 12010 controls the operation of devices related to a driving system of a vehicle in accordance with various programs. For example, the driving system control unit 12010 functions as a control device such as a driving force generating device for generating driving force of the vehicle such as an internal combustion engine or a driving motor, a driving force transmission mechanism for transmitting driving force to wheels, a steering mechanism for adjusting a steering angle of the vehicle, and a braking device for generating braking force of the vehicle.

The body system control unit 12020 controls the operation of various devices mounted to the vehicle body in accordance with various programs. For example, the body system control unit 12020 functions as a control device of a keyless entry system, a smart key system, an automatic window device, or various types of lamps such as a head lamp, a rear lamp, a brake lamp, an indicator lamp, or a fog lamp. In this case, the body system control unit 12020 may receive input of a radio wave transmitted from a portable device that substitutes a key or signals of various switches. The body system control unit 12020 receives input of such a radio wave or signal and controls a door lock device, an automatic window device, a lamp device, or other devices of the vehicle.

The external information detecting unit 12030 detects external information of the vehicle mounted with the vehicle control system 12000. For example, an imaging unit 12031 is connected to the external information detecting unit 12030. The external information detecting unit 12030 causes the imaging unit 12031 to capture an image outside the vehicle and receives the captured image. The external information detecting unit 12030 may perform object detection processing or distance detection processing of a person, a car, an obstacle, a sign, characters on a road surface, or the like on the basis of the received image.

The imaging unit 12031 is an optical sensor that receives light and outputs an electric signal depending on the amount of the light that has been received. The imaging unit 12031 can output the electric signal as an image or as ranging information. Meanwhile, the light received by the imaging unit 12031 may be visible light, or invisible light such as infrared rays.

The in-vehicle information detecting unit 12040 detects information inside the vehicle. The in-vehicle information detecting unit 12040 is connected with, for example, a driver state detecting unit 12041 that detects the state of a driver. The driver state detecting unit 12041 includes, for example, a camera that captures an image of a driver, and the in-vehicle information detecting unit 12040 may calculate the degree of fatigue or the degree of concentration of the driver on the basis of detection information input from the driver state detecting unit 12041 or may determine whether or not the driver is drowsing.

The microcomputer 12051 can calculate control target values of a driving force generating device, a steering mechanism, or a braking device on the basis of the information inside and outside the vehicle acquired by the external information detecting unit 12030 or the in-vehicle information detecting unit 12040 and output a control command to the driving system control unit 12010. For example, the microcomputer 12051 can perform cooperative control aimed at implementing a function of an advanced driver assistance system (ADAS) including collision avoidance or impact mitigation of the vehicle, following travelling based on the inter-vehicle distance, travelling with a maintained vehicle speed, collision warning of the vehicle, lane deviation warning of the vehicle, or the like.

Furthermore, the microcomputer 12051 can perform cooperative control for the purpose of, for example, autonomous driving, in which the vehicle travels autonomously without operation by a driver, by controlling a driving force generating device, a steering mechanism, a braking device, or the like on the basis of information of the surroundings of the vehicle that is acquired by the external information detecting unit 12030 or the in-vehicle information detecting unit 12040.

The microcomputer 12051 can also output a control command to the body system control unit 12020 on the basis of the information outside the vehicle that is acquired by the external information detecting unit 12030. For example, the microcomputer 12051 can perform cooperative control for the purpose of prevention of glare such as controlling the headlamps depending on the position of a preceding vehicle or an oncoming vehicle detected by the external information detecting unit 12030 and switching a high beam to a low beam.

The audio image output unit 12052 transmits an output signal of at least one of audio or an image to an output device capable of visually or audibly notifying information to a passenger or to the outside of the vehicle. In the example of FIG. 18, as the output device, an audio speaker 12061, a display unit 12062, and an instrument panel 12063 are illustrated as examples. The display unit 12062 may include at least one of, for example, an onboard display or a head-up display.

Figure 19:
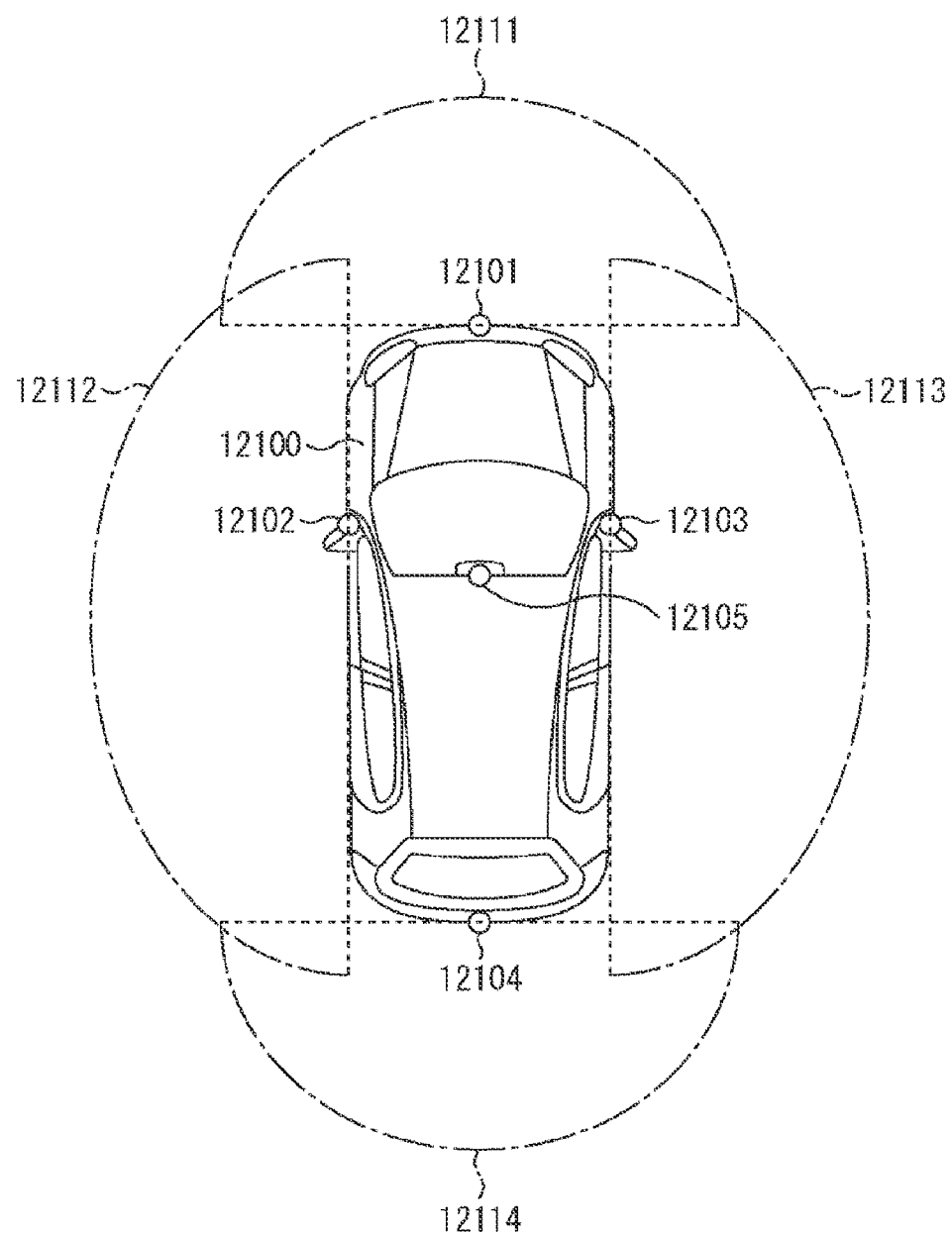

FIG. 19 is a diagram illustrating an example of installation positions of imaging units 12031.

In FIG. 19, as the imaging units 12031, imaging units 12101, 12102, 12103, 12104, and 12105 are included.

The imaging units 12101, 12102, 12103, 12104, and 12105 are installed at positions such as a front nose, side mirrors, a rear bumper, a rear door, and an upper part of a windshield inside a passenger compartment of a vehicle 12100. The imaging unit 12101 provided at the front nose and the imaging unit 12105 provided at the upper part of the windshield in the passenger compartment acquire mainly images ahead of the vehicle 12100. The imaging units 12102 and 12103 provided at the side mirrors acquire mainly images of the sides of the vehicle 12100. The imaging unit 12104 provided at the rear bumper or the rear door acquires mainly images in the back of the vehicle 12100. The imaging unit 12105 provided at the upper part of the windshield in the passenger compartment is used mainly for detection of a preceding vehicle, a pedestrian, an obstacle, a traffic signal, a traffic sign, lanes, or the like.

Note that an example of the coverage of the imaging units 12101 to 12104 is illustrated in FIG. 19. A coverage 12111 represents a coverage of the imaging unit 12101 provided at the front nose, coverages 12112 and 12113 represent coverages of the imaging units 12102 and 12103 provided at the side mirrors, respectively, and a coverage 12114 represents a coverage of the imaging unit 12104 provided at the rear bumper or the rear door. For example, by overlapping image data captured by the imaging units 12101 to 12104, an overhead view image of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements or may be an imaging element including pixels for detection of a phase difference.

For example, the microcomputer 12051 can extract, especially as a preceding vehicle, a three-dimensional object that is the closest on a traveling path of the vehicle 12100 and is travelling at a predetermined speed (for example, 0 km/h or more) in substantially the same direction as the vehicle 12100 by obtaining the distance to each three-dimensional object within the coverages 12111 to 12114 and temporal changes of this distance (relative velocity with respect to the vehicle 12100) on the basis of distance information obtained from the imaging units 12101 to 12104. The microcomputer 12051 can further set an inter-vehicle distance to be kept from a preceding vehicle in advance and perform, for example, automatic braking control (including follow-up stop control) or automatic acceleration control (including follow-up start control). In this manner, it is possible to perform coordinated control for the purpose of, for example, autonomous driving in which the vehicle travels autonomously without operation of the driver.

For example, the microcomputer 12051 can classify three-dimensional object data related to three-dimensional objects into two-wheeled vehicles, four-wheeled vehicles, large vehicles, pedestrians, and other three-dimensional objects such as utility poles on the basis of the distance information obtained from the imaging units 12101 to 12104, extract the classified data, and use the three-dimensional object data for automatic avoidance of obstacles. For example, the microcomputer 12051 distinguishes obstacles around the vehicle 12100 into obstacles that are visually recognizable and obstacles that are difficult to visually recognize by the driver of the vehicle 12100. Then, the microcomputer 12051 determines a collision risk indicating the risk of collision with each obstacle and in a case where the collision risk is higher than or equal to a set value and there is a possibility of collision, the microcomputer 12051 can perform driving assistance for collision avoidance by outputting a warning to the driver via the audio speaker 12061 or the display unit 12062 or by performing forced deceleration or avoidance steering via the driving system control unit 12010.

At least one of the imaging units 12101 to 12104 may be an infrared camera that detects infrared rays. For example, the microcomputer 12051 can recognize a pedestrian by determining whether or not there is a pedestrian in captured images of the imaging units 12101 to 12104. Such recognition of a pedestrian includes, for example, a procedure of extracting characteristic points in captured images of the imaging units 12101 to 12104 as infrared cameras and a procedure of determining whether or not an object is a pedestrian by performing pattern matching process on a series of characteristic points indicating the contour of the object. When the microcomputer 12051 determines that there is a pedestrian in the captured images of the imaging units 12101 to 12104 and recognizes the pedestrian, then the audio image output unit 12052 controls the display unit 12062 so as to superimpose and display a square contour line for emphasizing the pedestrian that has been recognized. The audio image output unit 12052 may further control the display unit 12062 so as to display an icon or the like that indicates a pedestrian at a desired position.

Figure 1B:
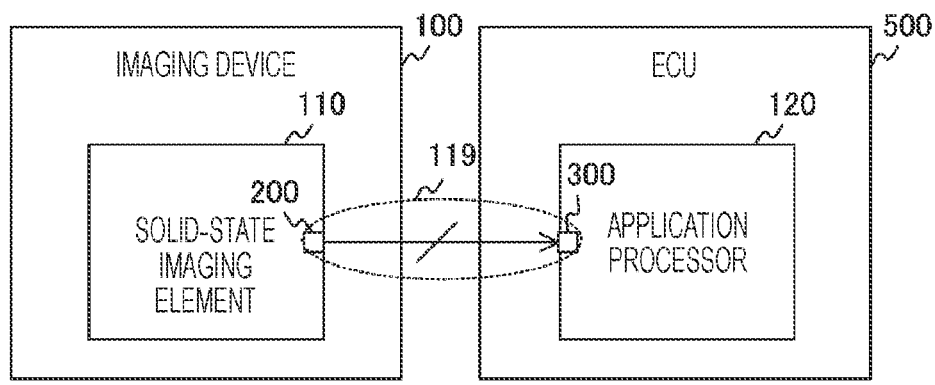

An example of the vehicle control system to which the technology according to the present disclosure can be applied has been described above. The technology according to the present disclosure can be applied to, for example, the imaging unit 12031 of the configuration described above. Specifically, the imaging device 100 of FIGS. 1A and 1B can be applied to the imaging unit 12031. By applying the technology according to the present disclosure to the imaging unit 12031, it is possible to shorten the stabilization time and to improve the response of the interface.

Note that the embodiments described above illustrate examples for embodying the present technology and that matters of the embodiments and matters specifying the invention in the claims correspond with each other. Likewise, matters specifying the invention in the claims and matters of the embodiments of the present technology denoted by the same name correspond with each other. However, the present technology is not limited to the embodiments and can be embodied by applying various modifications to the embodiments without departing from the principles thereof.

Note that the effects described herein are merely examples and thus are not limiting, and other effects may also be included.

Note that the present technology may also employ configurations as follows.

(1) A transmission device including:

an internal resistor having one end connected to an output terminal connected to a capacitor;

an internal circuit that supplies one of a plurality of potentials different from each other to another end of the internal resistor; and a transmission-side control unit that performs control to supply one of the plurality of potentials to the internal circuit over a period from time when a potential of the output terminal is initialized to a predetermined initial value to time when the potential of the output terminal reaches a predetermined specified value.

(2) The transmission device according to item (1), further including:

a timing supply unit that supplies data regarding timing at which the potential of the output terminal reaches the specified value, in which the transmission-side control unit acquires the timing from the data.

(3) The transmission device according to item (2), in which the timing supply unit supplies, to the transmission-side control unit, the data indicating time taken from the time when the potential is initialized to the initial value to the timing.

(4) The transmission device according to item (2), in which the timing supply unit supplies, as the data, a comparison result obtained from comparison between the specified value and the potential of the output terminal to the transmission-side control unit, and the transmission-side control unit acquires, as the timing, timing at which the comparison result is inverted.

(5) The transmission device according to any one of items (1) to (4), in which the capacitor includes a positive-side capacitor and a negative-side capacitor, the output terminal includes a non-inverting output terminal and an inverting output terminal, the internal resistor includes:

a positive-side internal resistor having one end connected to the non-inverting output terminal and a negative-side internal resistor having one end connected to the inverting output terminal, the plurality of potentials includes a pair of potentials, and the internal circuit supplies one of the pair of potentials to another end of the positive-side internal resistor and supplies another one of the pair of potentials to another end of the negative-side internal resistor.

(6) The transmission device according to any one of items (1) to (5), further including:

a parallel-serial converter that converts parallel data into serial data and supplies the serial data to the internal circuit, in which the transmission-side control unit generates the parallel data containing valid data obtained by encoding transmission data and invalid data for controlling the internal circuit and supplies the parallel data to the parallel-serial converter.

(7) An interface including:

a transmission device including: an internal resistor having one end connected to an output terminal connected to a capacitor; an internal circuit that supplies one of a plurality of potentials different from each other to another end of the internal resistor; and a transmission-side control unit that performs control to supply one of the plurality of potentials to the internal circuit over a period from time when a potential of the output terminal is initialized to a predetermined initial value to time when the potential of the output terminal reaches a predetermined specified value; and a reception device that receives data via the capacitor.

(8) A transmission method including:

an output step of supplying one of a plurality of potentials different from each other to another end of an internal resistor by an internal circuit, the internal resistor having one end connected to an output terminal connected to a capacitor; and a transmission-side control step of performing, by a transmission-side control unit, control to supply one of the plurality of potentials to the internal circuit over a period from time when a potential of the output terminal is initialized to a predetermined initial value to time when the potential of the output terminal reaches a predetermined specified value.

REFERENCE SIGNS LIST

100 Imaging device
110 Solid-state imaging element
119 Interface
120 Application processor
200 Transmission device
210 Encoder
220 Parallel-serial converter
230 Driver
231 Internal circuit
232 Positive-side internal resistor
233 Negative-side internal resistor
240 Register
251, 360 Positive-side comparator
252 Negative-side comparator
300 Reception device
311 Positive-side terminating resistor
312 Negative-side terminating resistor
313, 315, 316, 318 Switch
314 Power-supply-side resistor
317 Ground-side resistor
320 Receiver
330 Clock data recovery circuit
340 Serial-parallel converter
350 Decoder
370 Reception-side control unit
401 Positive-side capacitor
402 Negative-side capacitor
12031 Imaging unit

The invention claimed is:

1. A transmission device, comprising:
an internal resistor having one end connected to an output terminal connected to a capacitor;
an internal circuit that supplies one of a plurality of potentials different from each other to another end of the internal resistor; and
a transmission-side control unit that performs control to supply one of the plurality of potentials to the internal circuit over a period from time when a potential of the output terminal is initialized to a predetermined initial value to time when the potential of the output terminal reaches a predetermined specified value.

2. The transmission device according to claim 1, further comprising:
a timing supply unit that supplies data regarding timing at which the potential of the output terminal reaches the specified value,
wherein the transmission-side control unit acquires the timing from the data.

3. The transmission device according to claim 2,
wherein the timing supply unit supplies, to the transmission-side control unit, the data indicating time taken from the time when the potential is initialized to the initial value to the timing.

4. The transmission device according to claim 2,
wherein the timing supply unit supplies, as the data, a comparison result obtained from comparison between the specified value and the potential of the output terminal to the transmission-side control unit, and
the transmission-side control unit acquires, as the timing, timing at which the comparison result is inverted.

5. The transmission device according to claim 1,
wherein the capacitor includes a positive-side capacitor and a negative-side capacitor,
the output terminal includes a non-inverting output terminal and an inverting output terminal,
the internal resistor includes:
a positive-side internal resistor having one end connected to the non-inverting output terminal and
a negative-side internal resistor having one end connected to the inverting output terminal,
the plurality of potentials includes a pair of potentials, and
the internal circuit supplies one of the pair of potentials to another end of the positive-side internal resistor and supplies another one of the pair of potentials to another end of the negative-side internal resistor.

6. The transmission device according to claim 1, further comprising:
a parallel-serial converter that converts parallel data into serial data and supplies the serial data to the internal circuit,
wherein the transmission-side control unit generates the parallel data containing valid data obtained by encoding transmission data and invalid data for controlling the internal circuit and supplies the parallel data to the parallel-serial converter.

7. An interface, comprising:
a transmission device comprising: an internal resistor having one end connected to an output terminal connected to a capacitor; an internal circuit that supplies one of a plurality of potentials different from each other to another end of the internal resistor; and a transmission-side control unit that performs control to supply one of the plurality of potentials to the internal circuit over a period from time when a potential of the output terminal is initialized to a predetermined initial value to time when the potential of the output terminal reaches a predetermined specified value; and
a reception device that receives data via the capacitor.

8. A transmission method, comprising:
an output step of supplying one of a plurality of potentials different from each other to another end of an internal resistor by an internal circuit, the internal resistor having one end connected to an output terminal connected to a capacitor; and
a transmission-side control step of performing, by a transmission-side control unit, control to supply one of the plurality of potentials to the internal circuit over a period from time when a potential of the output terminal is initialized to a predetermined initial value to time when the potential of the output terminal reaches a predetermined specified value.

* * * * *